United States Patent
Chen et al.

(10) Patent No.: US 12,368,794 B2
(45) Date of Patent: Jul. 22, 2025

(54) ELECTRONIC DEVICE

(71) Applicant: GUANGDONG OPPO MOBILE TELECOMMUNICATIONS CORP., LTD., Guangdong (CN)

(72) Inventors: Yongliang Chen, Guangdong (CN); Bin Yin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 226 days.

(21) Appl. No.: 18/075,076

(22) Filed: Dec. 5, 2022

(65) Prior Publication Data
US 2023/0100316 A1 Mar. 30, 2023

Related U.S. Application Data

(63) Continuation of application No. PCT/CN2021/091130, filed on Apr. 29, 2021.

(30) Foreign Application Priority Data

Jun. 28, 2020 (CN) .......................... 202010601335.4

(51) Int. Cl.
*G06F 1/16* (2006.01)
*H04M 1/02* (2006.01)

(52) U.S. Cl.
CPC ....... *H04M 1/0268* (2013.01); *H04M 1/0237* (2013.01)

(58) Field of Classification Search
None
See application file for complete search history.

(56) References Cited

U.S. PATENT DOCUMENTS 11,832,406 B2 * 11/2023 Kim ...................... G06F 1/1652
2013/0342094 A1 * 12/2013 Walters ................... G09F 9/301
312/319.2

(Continued)

FOREIGN PATENT DOCUMENTS

CN 102681607 A 9/2012
CN 104347000 A 2/2015
(Continued)

OTHER PUBLICATIONS

Chinese Office Action with English Translation for CN Application 202010601335.4 mailed Dec. 22, 2022. (16 pages).

(Continued)

*Primary Examiner* — Imani N Hayman
*Assistant Examiner* — Rashen E Morrison
(74) *Attorney, Agent, or Firm* — Young Basile Hanlon & MacFarlane, P.C.

(57) ABSTRACT

An electronic device includes a first carrier, a second carrier, a driving mechanism, a flexible screen assembly, and an adjustment mechanism. The first carrier and the second carrier are movable relative to each other. The driving mechanism is disposed on the second carrier. The flexible screen assembly has a first end connected with the first carrier and the flexible screen assembly is wrapped around the driving mechanism. The driving mechanism is configured to drive the flexible screen assembly to move. The adjustment mechanism is configured to adjust the driving mechanism to make the flexible screen assembly in a tensioned state.

19 Claims, 15 Drawing Sheets

(56) References Cited

U.S. PATENT DOCUMENTS

| | | | |
|---|---|---|---|
| 2016/0116944 A1 | 4/2016 | Lee et al. | |
| 2017/0357287 A1 | 12/2017 | Yang | |
| 2020/0264660 A1* | 8/2020 | Song | G06F 1/1624 |
| 2021/0195008 A1* | 6/2021 | Lee | G06F 1/1652 |
| 2022/0183167 A1* | 6/2022 | Liu | H05K 5/0217 |
| 2022/0408573 A1 | 12/2022 | Jo et al. | |

FOREIGN PATENT DOCUMENTS

| | | | |
|---|---|---|---|
| CN | 105518767 A | 4/2016 |
| CN | 106652798 A | 5/2017 |
| CN | 107919065 A | 4/2018 |
| CN | 107980157 A | 5/2018 |
| CN | 109270987 A | 1/2019 |
| CN | 109495621 A | 3/2019 |
| CN | 110191207 A | 8/2019 |
| CN | 110493398 A | 11/2019 |
| CN | 110572497 A | 12/2019 |
| CN | 110599912 A | 12/2019 |
| CN | 110782783 A | 2/2020 |
| CN | 210606390 U | 5/2020 |
| EP | 3543587 A1 | 9/2019 |
| IN | 112309258 A | 2/2021 |
| KR | 20140054498 A | 5/2014 |
| WO | 2021049688 A1 | 3/2021 |

OTHER PUBLICATIONS

International Search Report and Written Opinion with English Translation for International Application No. PCT/CN2021/091130 mailed Aug. 3, 2021.
Extended European Search Report for EP Application 21833551.1 mailed Oct. 26, 2023. (12 pages).

* cited by examiner

ELECTRONIC DEVICE

CROSS-REFERENCE TO RELATED APPLICATION(S)

This application is a continuation of International Application No. PCT/CN2021/091130, filed Apr. 29, 2021, which claims priority to Chinese Patent Application No. 202010601335.4 filed Jun. 28, 2020, the entire disclosures of both of which are incorporated herein by reference.

TECHNICAL FIELD

This disclosure relates to the field of electronic technology, and in particular to an electronic device.

BACKGROUND

With development of electronic technology, display devices of electronic devices such as smart phones are becoming more and more intelligent. A display device of an electronic device can display a picture through a display screen of the display device.

A flexible display screen has attracted much attention due to folding and bending characteristics of the flexible display screen. By driving the flexible display screen to be extended outside the electronic device or retracted inside the electronic device, a screen display region of the electronic device can be adjusted, but the flexible display screen may be slack and wrinkled during mounting or after a period of use.

SUMMARY

An electronic device is provided in implementations of the present disclosure. The electronic device includes a first carrier and a second carrier, a driving mechanism, a flexible screen assembly, and an adjustment mechanism. The first carrier and the second carrier are movable relative to each other. The driving mechanism is disposed on the second carrier. The flexible screen assembly has a first end connected with the first carrier and is wrapped around the driving mechanism. The driving mechanism is configured to drive the flexible screen assembly to move when the first carrier and the second carrier move relative to each other. The adjustment mechanism is configured to adjust the driving mechanism to make the flexible screen assembly in a tensioned state.

An electronic device is further provided in implementations of the present disclosure. The electronic device includes a first carrier, a second carrier, a flexible screen assembly, and an adjustment mechanism. The first carrier and the second carrier are movable relative to each other to drive the flexible screen assembly to move. When the flexible screen assembly is slack, the adjustment mechanism is configured to adjust the flexible screen assembly to make the flexible screen assembly in a tensioned state.

DETAILED DESCRIPTION

Figure 1:
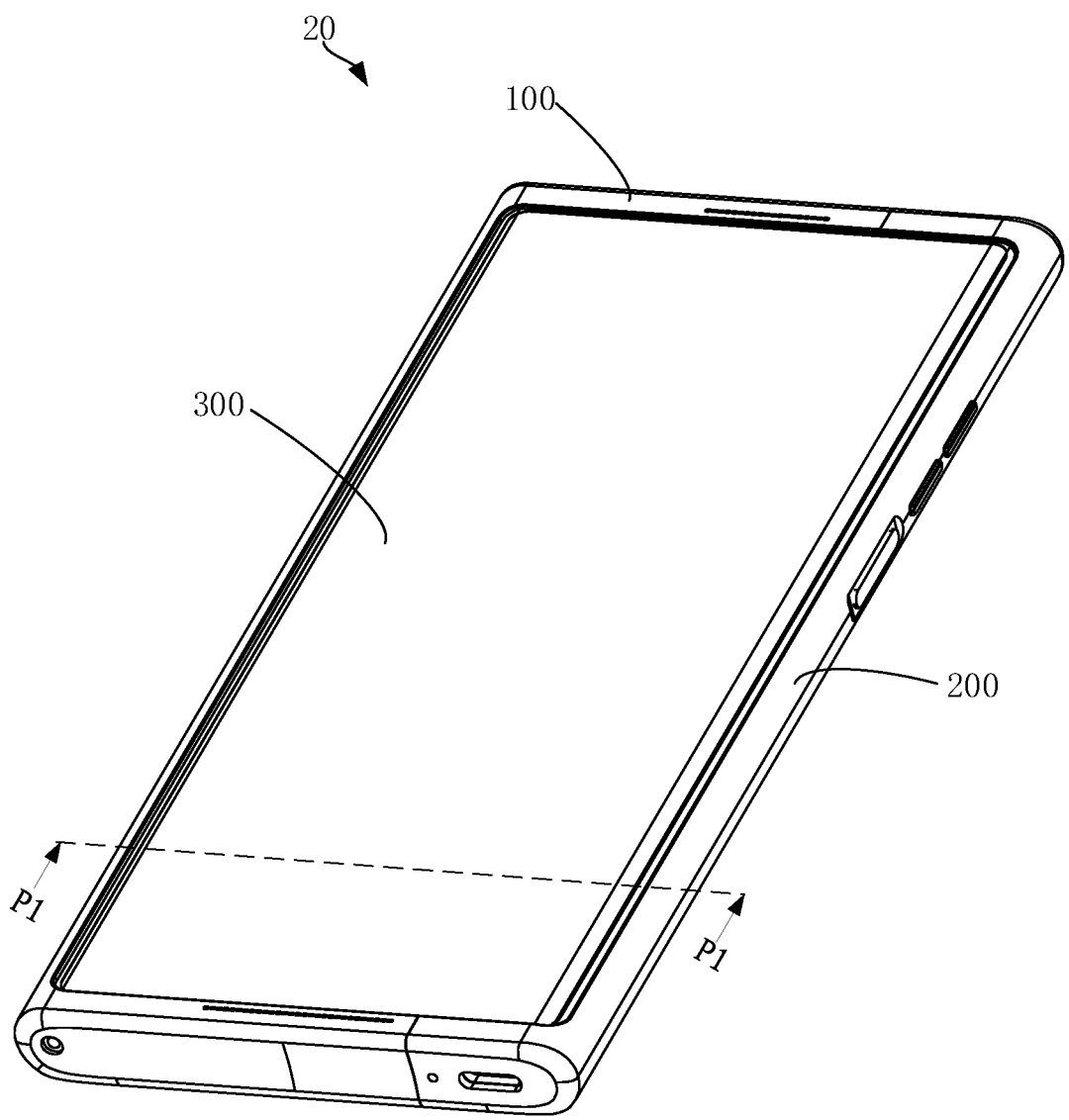
FIG. 1 is a schematic structural diagram of an electronic device provided in implementations of the present disclosure.

An electronic device is provided in implementations of the present disclosure. The electronic device includes a first carrier and a second carrier, a driving mechanism, a flexible screen assembly, and an adjustment mechanism. The first carrier and the second carrier are movable relative to each other to make the first carrier and the second carrier switch between a retracting state and an extending state. The driving mechanism is disposed on the second carrier. The flexible screen assembly has a first end connected with the first carrier and is wrapped around the driving mechanism.

The driving mechanism is configured to drive the flexible screen assembly to move, to make a part of the flexible screen assembly extend outside the electronic device or retract inside the electronic device, when the first carrier and the second carrier move relative to each other. The adjustment mechanism is configured to adjust the driving mechanism, to make the flexible screen assembly in a tensioned state.

In implementations of the present disclosure, the adjustment mechanism is disposed, such that when the flexible screen assembly is slack, the flexible screen assembly can be adjusted, which solves a problem that the flexible screen assembly is easy to be slack and be wrinkled in the related art, and can make the flexible screen assembly in the tensioned state.

In an optional implementation of the present disclosure, the driving mechanism includes a first driving member and a second driving member spaced apart from the first driving member. The flexible screen assembly is wrapped around the first driving member and the second driving member in turn. The adjustment mechanism is configured to adjust the first driving member and/or the second driving member to increase a distance between the first driving member and the second driving member.

In an optional implementation of the present disclosure, the flexible screen assembly has a second end connected with the first carrier. A projection of the second end on a plane where the first carrier is located falls between a projection of the first driving member on the plane where the first carrier is located and a projection of the second driving member on the plane where the first carrier is located.

In an optional implementation of the present disclosure, the flexible screen assembly has a second end connected with the second driving member, and the second driving member is rotatable to wind or release the flexible screen assembly.

In an optical implementation of the present disclosure, the first driving member has a diameter larger than the second driving member.

In an optional implementation of the present disclosure, the second driving member is movably connected with the second carrier through a first bracket. The adjustment mechanism includes a first elastic member. The first elastic member has one end abutting against the first bracket and another end abutting against the second carrier. The first elastic member is in a compressed state to apply an elastic force to the first bracket. When the flexible screen assembly is slack, the first elastic member is elastically deformed to drive the second driving member to move in a direction away from the first driving member.

In an optional implementation of the present disclosure, an elastic deformation amount of the first elastic member is positively related to a slackness degree of the flexible screen assembly.

In an optional implementation of the present disclosure, the second carrier is provided with a protrusion. The first bracket defines a through hole, and the protrusion passes through the through hole. The through hole has a size larger than the protrusion, and a first movement space is defined between the first bracket and the protrusion in a movement direction of the flexible screen assembly.

In an optional implementation of the present disclosure, the first movement space is smaller than a maximum deformation amount of the first elastic member to keep the first elastic member in the compressed state.

In an optional implementation of the present disclosure, the second carrier defines an accommodating groove. The first bracket has a straight portion and a bending portion. The straight portion is sleeved on the protrusion through the through hole, and the bending portion is bendably disposed relative to the straight portion. The bending portion is located in the accommodating groove. A second movement space is defined between the bending portion and a groove wall of the accommodating groove. The first elastic member is accommodated in the accommodating groove. The first elastic member has one end abutting against the bending portion and another end abutting against the groove wall of the accommodating groove.

In an optional implementation of the present disclosure, the first driving member is fixedly connected with the second carrier.

In an optional implementation of the present disclosure, the first driving member is movably connected with the second carrier through a second bracket. The adjustment mechanism further includes a second elastic member. The second elastic member has one end abutting against the second bracket and another end abutting against the second carrier. The second elastic member is in the compressed state to apply an elastic force to the second bracket. When the flexible screen assembly is slack, the second elastic member is elastically deformed to drive the first driving member to move in a direction away from the second driving member.

In an optional implementation of the present disclosure, the first driving member is movably connected with the second carrier through a second bracket. The second driving member is movably connected with the second carrier through a first bracket. The adjustment mechanism includes a first elastic member. The first elastic member has one end abutting against the second bracket and another end abutting against the first bracket. The first elastic member is in a compressed state to apply an elastic force to the first bracket and the second bracket. When the flexible screen assembly is slack, the first elastic member is elastically deformed to drive the first driving member to move in a direction away from the second driving member and drive the second driving member to move in a direction away from the first driving member.

In an optional implementation of the present disclosure, the first driving member is disposed at one side of the second carrier, the second driving member is disposed at an opposite side of the second carrier. The first driving member is movably connected with the second carrier through a second bracket, and the second driving member is fixedly connected with the second carrier. The adjustment mechanism includes a first elastic member. The first elastic member has one end abutting against a first bracket and another end abutting against the second carrier. The first elastic member is in a compressed state to apply an elastic force to the second bracket. When the flexible screen assembly is slack, the first elastic member is elastically deformed to drive the first driving member to move in a direction away from the second driving member.

In an optional implementation of the present disclosure, the electronic device further includes a processor and a detecting mechanism. The processor is electrically coupled with the detecting mechanism and the adjustment mechanism respectively. The detecting mechanism is configured to detect a state of the flexible screen assembly. The processor is configured to control the adjustment mechanism to drive the first driving member to move in a direction away from the second driving member, and/or control the second driving member to move in a direction away from the first driving member, to increase the distance between the first driving member and the second driving member, when the flexible screen assembly is slack.

In an optional implementation of the present disclosure, the electronic device further includes a driving apparatus. The driving apparatus includes a driving motor, a transmission screw rod, and a connecting member. The connecting member is connected with the transmission screw rod. The connecting member is connected with the second carrier.

In an optional implementation of the present disclosure, the flexible screen assembly includes a flexible display module and a driving belt. The flexible display module has a first end which serves as the first end of the flexible screen assembly and is connected with the first carrier, and the flexible display module has a second end connected with a first end of the driving belt. The flexible display module is wrapped around the first driving member. A second end of the driving belt which serves as the second end of the flexible screen assembly is connected to the first carrier, and the driving belt is wrapped around the second driving belt.

In an optional implementation of the present disclosure, the flexible screen assembly includes a flexible display module, a support member, and a driving belt. The flexible display module covers the support member. The support member is wrapped around the first driving member. The support member has a first end which serves as the first end of the flexible screen assembly and is connected with the first carrier. The support member has a second end connected with a first end of the driving belt. A second end of the driving belt which serves as the second end of the flexible screen assembly is connected with the first carrier. The driving belt is wrapped around the second driving member.

An electronic device is further provided in implementations of the present disclosure. The electronic device includes a first carrier, a second carrier, a flexible screen assembly, and an adjustment mechanism. The first carrier and the second carrier are movable relative to each other to drive the flexible screen assembly to move, to make a part of the flexible screen assembly extend outside the electronic device or retract inside the electronic device. When the flexible screen assembly is slack, the adjustment mechanism is configured to adjust the flexible screen assembly to make the flexible screen assembly in a tensioned state.

In an optional implementation of the present disclosure, the adjustment mechanism is configured to adjust a first end of the flexible screen assembly to absorb a slackness amount of the flexible screen assembly, when the flexible screen assembly is slack.

In an optional implementation of the present disclosure, the second carrier is provided with a first driving member. The flexible screen assembly is wrapped around the first driving member. The flexible screen assembly has the first end connected with the first carrier. The adjustment mechanism is configured to adjust a bending part of the flexible screen assembly to increase a distance between the bending part of the flexible screen assembly and the first end of the flexible screen assembly.

In an optional implementation of the present disclosure, the second carrier is provided with a second driving member. The second driving member is spaced apart from the first driving member. The flexible screen assembly has a second end connected with the second driving member. The second driving member is rotatable to wind or release the flexible screen assembly.

In an optional implementation of the present disclosure, the second carrier is provided with a first driving member. The flexible screen assembly is wrapped around the first driving member. The flexible screen assembly has a first end movably connected with the first carrier. When the flexible screen assembly is slack, the adjustment mechanism is configured to control the first end of the flexible screen assembly to move in a direction away from the first driving member, to absorb a slackness amount of the flexible screen assembly.

Technical solutions of implementations of the present disclosure will be described clearly and completely with reference to accompanying drawings in implementations of the present disclosure below. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

An electronic device is provided in implementations of the present disclosure. The electronic device includes a flexible screen assembly. The flexible screen assembly can extend to increase a display region of the electronic device or retract to maintain a conventional appearance of a handheld device. The electronic device may be a laptop computer, a tablet computer, a cellular telephone, or other handheld or portable electronic devices. The electronic device may also be a wearable device (such as a smart watch) or other portable devices. For example, in the following specific description, the electronic device is a cellular phone.

Figure 2:
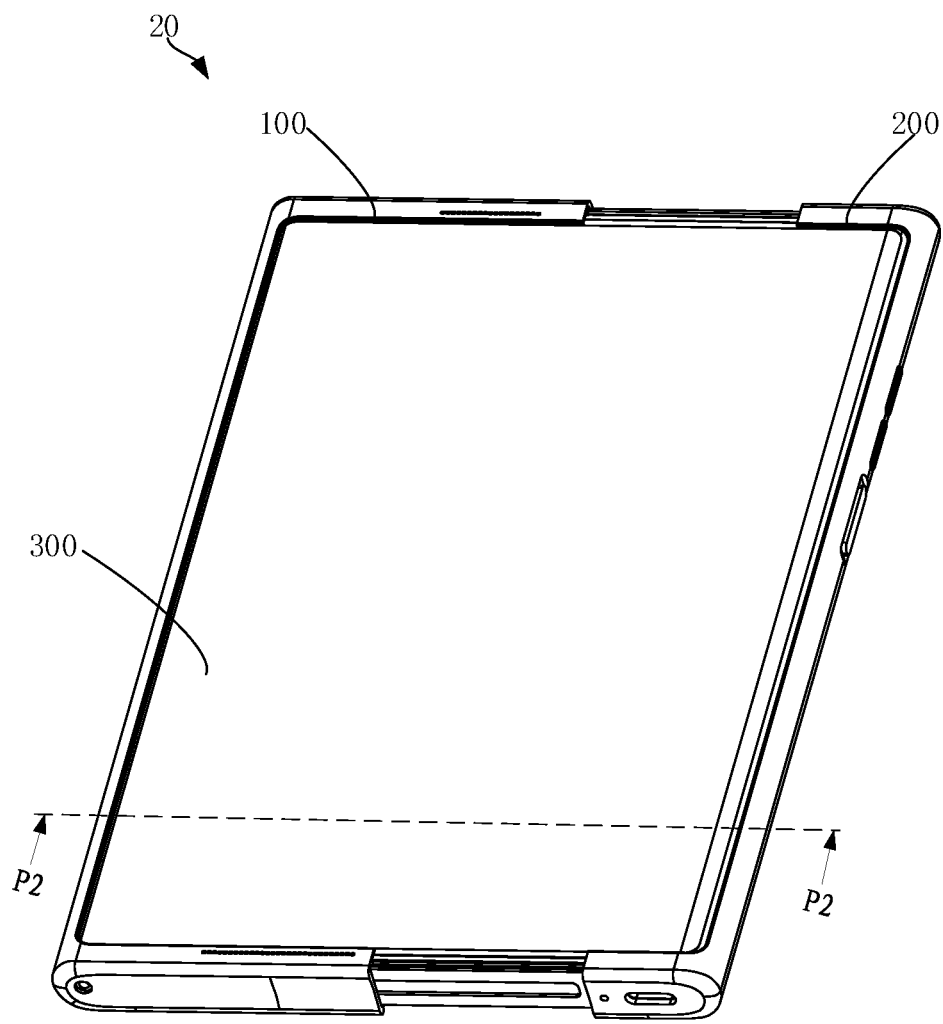
FIG. 2 is a schematic structural diagram of an electronic device provided in other implementations of the present disclosure.

Reference can be made to FIG. 1 and FIG. 2, where FIG. 1 is a schematic structural diagram of an electronic device provided in implementations of the present disclosure, and FIG. 2 is a schematic structural diagram of an electronic device provided in other implementations of the present disclosure. The electronic device 20 may include a first carrier 100, a second carrier 200, and a flexible screen assembly 300. It should be noted that the electronic device 20 illustrated in FIG. 1 and FIG. 2 is exemplary only and the electronic device 20 may also include other components such as a battery, a camera assembly, etc.

The first carrier 100 and the second carrier 200 are movable relative to each other, which can be realized by a slidable connection of the first carrier 100 and the second carrier 200. For example, the first carrier 100 defines a sliding groove, and a side edge of the second carrier 200 being located in the sliding groove and able to slide in the sliding groove. An extending state and a retracting state can be switched by relative movement of the first carrier 100 and the second carrier 200. Referring to FIG. 1, the retracting state is a state finally formed by relative movement of the first carrier 100 and the second carrier 200 in directions close to each other. Referring to FIG. 2, the extending state is a state formed by relative movement of the first carrier 100 and the second carrier 200 in directions away from each other.

It can be understood that in the retracting state, when the first carrier 100 and the second carrier 200 move in the directions away from each other, the second carrier 200 can move from the inside of the first carrier 100 to the outside of the first carrier 100, to switch from the retracting state to the extending state. In the extending state, when the first carrier 100 and the second carrier 200 move in the directions close to each other, the second carrier 200 may move from the outside of the first carrier 100 to the inside of the first carrier 100, to switch from the extending state to the retracting state.

It should be noted that the first carrier 100 and the second carrier 200 can have various extending states, for example, a maximum movement distance between the first carrier 100 and the second carrier 200 in the directions away from each other is H, and the first carrier 100 and the second carrier 200 can move away from each other in the retracting state to form extending states with different distances such as a quarter of H, a half of H, three quarters of H, etc. States in which the distance gradually grows can be defined as a first extending state, a second extending state, a third extending state, and the like in turn.

It should also be noted that when the first carrier 100 and the second carrier 200 are in the first extending state, for example the first carrier 100 and the second carrier 200 move away from each other by a distance of a quarter of H to be in the first extending state, the first carrier 100 and the second carrier 200 can still move away from each other to reach the second extending state, for example the first carrier 100 and the second carrier 200 move away from each other by a distance of a half of H to be in the second extending state.

It can be understood that one or more of extending states of the first carrier 100 and the second carrier 200 in implementations of the present disclosure are illustrative only, and are not intended to limit the extending states of the first carrier 100 and the second carrier 200 of the implementations of the present disclosure.

Figure 3:
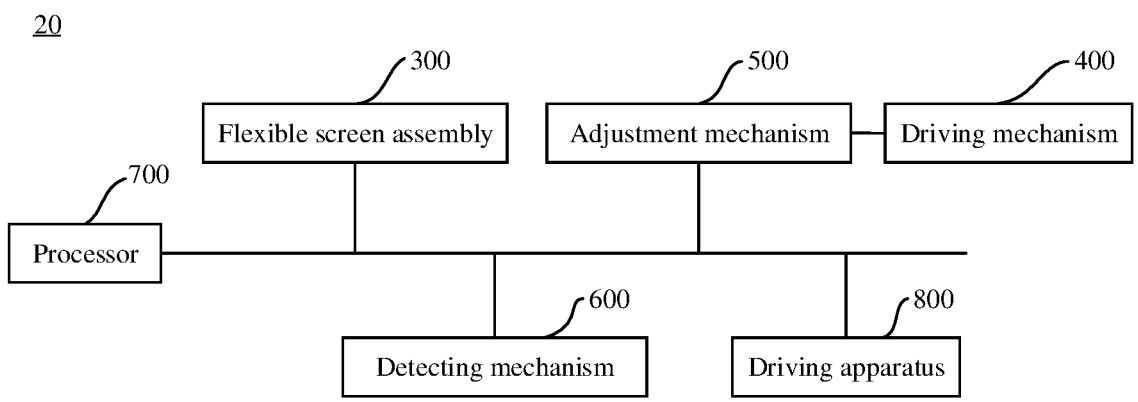
FIG. 3 is a schematic structural diagram of an electronic device provided in other implementations of the present disclosure.
Figure 4:
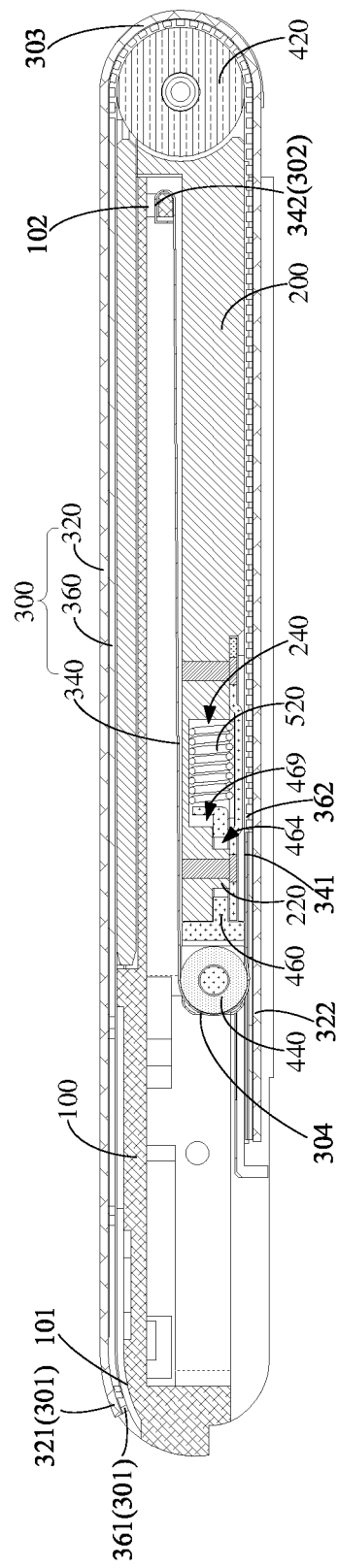
FIG. 4 is a schematic cross-sectional diagram of the electronic device of FIG. 2 taken in direction P2-P2.
Figure 5:
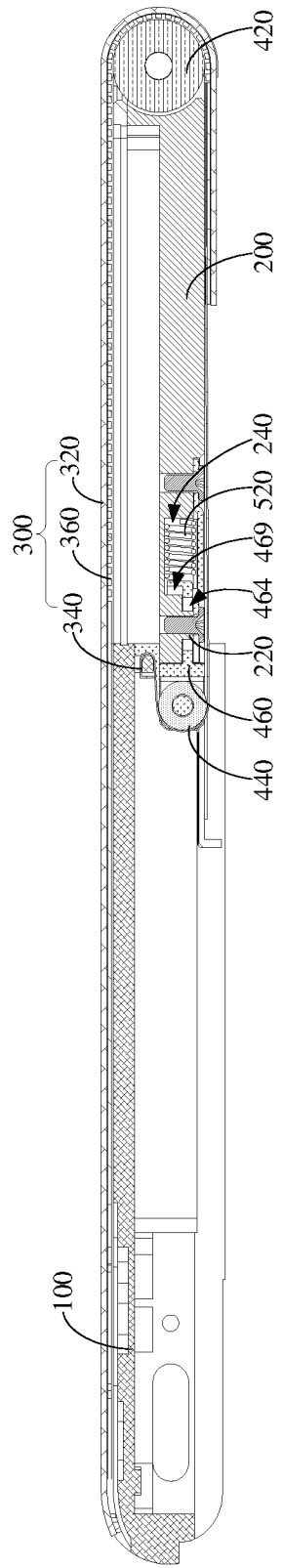
FIG. 5 is a schematic structural diagram of a flexible screen assembly, a first driving member, and a second driving member in the electronic device illustrated in FIG. 3.

Reference can be made FIG. 3 to FIG. 5 together, where FIG. 3 is a third schematic structural diagram of an electronic device provided in implementations of the present disclosure, FIG. 4 is a schematic cross-sectional diagram of the electronic device of FIG. 1 taken in direction P1-P1, and FIG. 5 is a schematic cross-sectional diagram of the electronic device of FIG. 1 taken in direction P2-P2. When the first carrier 100 and the second carrier 200 are in the retracting state, the first carrier 100 and the second carrier 200 are fitted to each other. Here, an accommodation space can be defined between the first carrier 100 and the second carrier 200, and the accommodation space can be used to accommodate other components of the electronic device 20, such as a circuit board, a battery, a camera assembly, etc. A part of the flexible screen assembly 300 is also accommodated in the accommodation space. In addition, the flexible screen assembly 300 has a first end 301 connected with the first carrier 100, and the flexible screen assembly 300 is wrapped around a driving mechanism 400 connected with the second carrier 200. It should be noted that the driving mechanism 400 may be directly connected with the second carrier 200, or indirectly connected with the second carrier 200 through other components. When the first carrier 100 and the second carrier 200 in the retracting state move away from each other, the driving mechanism 400 can drive the flexible screen assembly 300 to move in a direction towards the outside of the accommodation space, or the outside of the electronic device 20, such that a part of the flexible screen assembly 300 originally accommodated in the accommodation space extends outside the accommodation space, or outside the electronic device 20, which increases a display region of the electronic device 20. When the first carrier 100 and the second carrier 200 in the extending state move close to each other, the driving mechanism 400 can drive the flexible screen assembly 300 to move in a direction towards the inside of the electronic device 20, such that a part of the flexible screen assembly 300 which originally extends outside the electronic device 20 retracts inside the electronic device 20, which makes the electronic device 20 restored to a traditional appearance and convenient to be carried.

The flexible screen assembly 300 is usually made of a flexible material, which may make the flexible screen assembly 300 mounted too slack (or make the flexible screen assembly 300 not tensioned) due to improper operation of a mounter during mounting, or the flexible screen assembly 300 may be elongated due to fatigue after a period of use, which may lead to slackness of the flexible screen assembly 300 mounted at the first carrier 100 and the second carrier 200. However, when the flexible screen assembly 300 is slack, the flexible screen assembly 300 may be wrinkled during movement, such that the flexible screen assembly 300 is damaged. In order to solve this problem, an adjustment mechanism is disposed in implementations of the present disclosure, such as an adjustment mechanism 500, which can adjust the driving mechanism 400, such that a slackness amount of the flexible screen assembly 300 can be absorbed to make the flexible screen assembly 300 in a tensioned state. It can be understood that a slackness amount of the flexible screen assembly 300 caused by improper mounting or aging of the flexible screen assembly 300 after a period of use is generally relatively small. In implementations of the present disclosure, the adjustment mechanism 500 makes a minor adjustment to a distance between components of the driving mechanism 400 when adjusting, as long as the slackness amount can be absorbed to make the flexible screen assembly 300 is in the tensioned state.

The driving mechanism 400 may include a first driving member 420 and a second driving member 440. The first driving member 420 is spaced apart from the second driving member 440. For example, the first driving member 420 may be connected with one side of the second carrier 200, the second driving member 440 may be connected with the other side of the second carrier 200, and the other side of the second carrier 200 is disposed opposite to the one side of the second carrier 200. The first driving member 420 is away from the first end 301 of the flexible screen assembly 300 relative to the second driving member 440. The first driving member 420 may be in a regular shape, such as a cylinder or a semi-cylinder, or in an irregular shape, for example one surface of the first driving member 420 may be a circular arc surface, and the other surfaces may be flat surfaces or wavy surfaces. The first driving member 420 may be an additional component independent of the second carrier 200, or a part of the second carrier 200. The second driving member 440 may have the same structure as the first driving member 420, for example, the first driving member 420 and the second driving member 440 may both have cylindrical structures. The second driving member 440 may also have a different structure from the first driving member 420.

The flexible screen assembly 300 is wound around the first driving member 420 and the second driving member 440 in turn. The flexible screen assembly 300 has a second end 302 connected with the first carrier 100, and a projection of the second end 302 on a plane where the first carrier 100 is located falls between a projection of the first driving member 420 on the plane where the first carrier 100 is located and a projection of the second driving member 440 on the plane where the first carrier 100 is located. It can be seen from FIG. 4 and FIG. 5 that when the first carrier 100 and the second carrier 200 move away from each other, a part of the flexible screen assembly 300 from the first end 301 of the flexible screen assembly 300 to a position of the first driving member 420 becomes longer, and a part of the flexible screen assembly 300 from the second end 302 of the flexible screen assembly 300 to a position of the second driving member 440 becomes shorter. When the first carrier 100 and the second carrier 200 move close to each other, the part of the flexible screen assembly 300 from the first end 301 of the flexible screen assembly 300 to the position of the first driving member 420 becomes shorter, and the part of the flexible screen assembly 300 from the second end 302 of the flexible screen assembly 300 to the position of the second driving member 440 becomes longer. However, during relative movement of the second carrier 200 and the first carrier 100, a length of a part of the flexible screen assembly 300 from the position of the first driving member 420 to the position of the second driving member 440 is kept unchanged.

It can be understood that when the flexible screen assembly 300 is wrapped around the first driving member 420, a part of the flexible screen assembly 300 at a position of the first driving member 420 forms a first turn 303, and when the flexible screen assembly 300 is wrapped around the second driving member 440, a part of the flexible screen assembly 300 at a position of the second driving member 440 forms a second turn 304. When the second carrier 200 moves relative to the first carrier 100, the flexible screen assembly 300 moves relative to the first driving member 420 and the second driving member 440. During extension of the first carrier 100 and the second carrier 200, the part of the flexible screen assembly 300 from the first end 301 to the first turn 303 becomes longer, and the part of the flexible screen assembly 300 from the second turn 304 to the second end 302 becomes shorter. The first turn 303 refers to a part of the flexible screen assembly 300 abutting against the first driving member 420, and the second turn 304 refers to a part of the flexible screen assembly 300 abutting against the second driving member 440. The part of the flexible screen assembly 300 from the first end 301 to the first turn 303 refers to a part of the flexible screen assembly 300 from the first end 301 to any position in the first turn 303, such as a position where the first turn 303 is tangent to the first driving member 420 or a middle position in the first turn 303. The part of the flexible screen assembly 300 from the second turn 304 to the second end 302 refers to a part of the flexible screen assembly 300 from the second end 302 to any position in the second turn 304, such as a position where the second turn 304 is tangent to the second driving member 440 or a middle position in the second turn 304.

It is assumed that the first carrier 100 and the second carrier 200 move away from each other by a movement distance of L1, since the first driving member 420 and the second driving member 440 are connected with the second carrier 200, each of a movement distance between the first driving member 420 and the first carrier 100 and a movement distance between the second driving member 440 and the first carrier 100 is also L1. The flexible screen assembly 300 is wrapped around two driving members, and when the two driving members move, the two driving members will drive the flexible screen assembly 300 to extend together, such that the part of the flexible screen assembly 300 from the first end 301 of the flexible screen assembly 300 to the first turn 303 becomes longer, a length increased is also L1. The part of the flexible screen assembly 300 from the second end 302 of the flexible screen assembly 300 to the second turn 304 becomes shorter. Since an overall length of the flexible screen assembly 300 is unchanged when the flexible screen assembly 300 is not fatigue, and a distance between the first driving member 420 and the second driving member 440 is unchanged, a length by which the part of the flexible screen assembly 300 from the second end 302 of the flexible screen assembly 300 to the second turn 304 is shortened should also be L1. Similarly, it is assumed that the first carrier 100 and the second carrier 200 move close to each other by a movement distance of L2, a length of the part of the flexible screen assembly 300 from the first end 301 of the flexible screen assembly 300 to the first turn 303 increases by L2 compared with the length before movement, and a length of the part of the flexible screen assembly 300 from the second end 302 of the flexible screen assembly 300 to the second turn 304 decreases by L2 compared with the length before movement.

In the related art, a flexible display screen is usually fixed by fixing one end of the flexible display screen and rolling and winding the other end of the flexible display screen around a scroll. In addition, when two housings move relative to each other, the flexible display screen is released or wound by rotation of the scroll. In this way, when the two housings have started to move, the scroll may have not yet started to rotate, which results in slackness of the flexible display screen due to no support of the housings, or when the scroll has started to rotate, the two housings may have not yet started to move, which results in a damage to a flexible screen due to an excessive force on the flexible display screen. It can be understood that in the related art, relative movement of the two housings and movement of the flexible screen assembly are driven separately, such that the relative movement of the two housings and the movement of the flexible screen assembly may be not synchronized due to asynchronous driving of the relative movement of the two housings and the movement of the flexible screen assembly. However, in implementations of the present disclosure, the flexible screen assembly 300 is wrapped around the first driving member 420 and the second driving member 440. The two ends of the flexible screen assembly 300 each are connected with the first carrier 100. When the first carrier and the second carrier are driven by a driving force (which may be a force applied by manual driving or a driving force applied by electric driving) to move, the first carrier and the second carrier will drive the flexible screen assembly 300 to move together. Compared with the related art, consistency between relative movement of the two carriers and movement of the flexible screen assembly 300 can be ensured, and a damage to the flexible screen assembly 300 can be reduced during movement of the two carriers.

In addition, in a manner that the flexible display screen is rolled and wound in the related art, during winding or releasing, a difference may exist between a rolling amount and a releasing amount, which results in different overall lengths of the flexible display screen in each state, such that the flexible display screen has different flatness in each state, thereby affecting a display effect of the flexible display screen. However, in implementations of the present disclosure, a length of the flexible screen assembly 300 is kept unchanged in each state, such that during movement of the flexible screen assembly 300, or when a part of the flexible screen assembly 300 retracts inside the electronic device 20, or when a part of the flexible screen assembly 300 extends outside the electronic device 20, flatness of the flexible screen assembly 300 is kept unchanged, which can provide a better display effect for a user.

As illustrated in FIG. 4 to FIG. 5, the first driving member 420 and the second driving member 440 in implementations of the present disclosure each have a cylindrical structure, and the first driving member 420 has a radius larger than the second driving member 440. Compared with setting a radius of the second driving member 440 to be the same as or larger than the radius of the first driving member 420, by setting a size of the second driving member 440 in the electronic device 20 to be smaller than a size of the first driving member 420, it is possible to save an internal space of the electronic device 20 occupied by the second driving member 440.

A direction in which the flexible screen assembly 300 is wrapped around the first driving member 420 is the same as a direction in which the flexible screen assembly 300 is wrapped around the second driving member 440. For example, the flexible screen assembly 300 may be wrapped around the first driving member 420 clockwise and the flexible screen assembly 300 may be wrapped around the second driving member 440 clockwise.

When the flexible screen assembly 300 moves, the flexible screen assembly 300 rubs against surfaces of the first driving member 420 and the second driving member 440. When a friction force is too large, movement of the flexible screen assembly 300 is impeded, which reduces smoothness of the movement of the flexible screen assembly 300 and damages the flexible screen assembly 300. In implementations of the present disclosure, in order to improve the smoothness of the movement of the flexible screen assembly 300, the first driving member 420 is configured to be rotatable relative to the second carrier 200, and the second driving member 440 is configured to be rotatable relative to the second carrier 200, where a rotation direction of the first driving member 420 is the same as a rotation direction of the second driving member 440.

For example, the second carrier 200 may be provided with a first fixed shaft at one side of the second carrier 200, and the first driving member 420 may be sleeved on the first fixed shaft and rotatably connected with the first fixed shaft (for example, the first driving member 420 may be connected with the first fixed shaft through balls). The second carrier 200 may be provided with a second fixed shaft at the other side of the second carrier 200, and the second driving member 440 may be sleeved on the second fixed shaft and rotatably connected with the second fixed shaft (for example, the second driving member 440 may be connected with the second fixed shaft through balls). When the first carrier 100 and the second carrier 200 move away from each other, the first driving member 420 is configured to push the flexible screen assembly 300 to move in first direction F1. When the flexible screen assembly 300 moves, the flexible screen assembly 300 is configured to drive the first driving member 420 to rotate around the first fixed shaft counterclockwise and drive the second driving member 440 to rotate around the second fixed shaft clockwise, so as to extend a part of the flexible screen assembly 300 to the outside of the electronic device 20 to expand a display region of the flexible screen assembly 300. When the first carrier 100 and the second carrier 200 move close to each other, the second driving member 440 is configured to push the flexible screen assembly to move in second direction F2. When the flexible screen assembly 300 moves, the flexible screen assembly 300 is configured to drive the second driving member 440 to rotate around the second fixed shaft clockwise and drive the first driving member 420 to rotate around the first fixed shaft clockwise, so as to retract a part of the flexible screen assembly 300 to the inside of the electronic device 20, thereby reducing the display region of the flexible screen assembly 300 and reducing an overall size of the electronic device 20. Compared with the first driving member 420 and the second driving member 440 each being fixed, the first driving member 420 and the second driving member 440 in implementations of the present disclosure can rotate relative to the second carrier 200, which can reduce a movement friction force between the flexible screen assembly 300 and each of the first driving member 420 and the second driving member 440 during the movement of the flexible screen assembly 300, improve the smoothness of the movement of the flexible screen assembly 300, and reduce a damage to the flexible screen assembly 300.

When the flexible screen assembly 300 is slack due to improper mounting, being elongated caused by fatigue for repeated use, or other reasons, the adjustment mechanism 500 in implementations of the present disclosure can adjust the first driving member 420 and/or the second driving member 440, such that the distance between the first driving member 420 and the second driving member 440 is increased, thereby absorbing the slackness amount of the flexible screen assembly 300 and making the flexible screen assembly 300 in the tensioned state.

Figure 6:
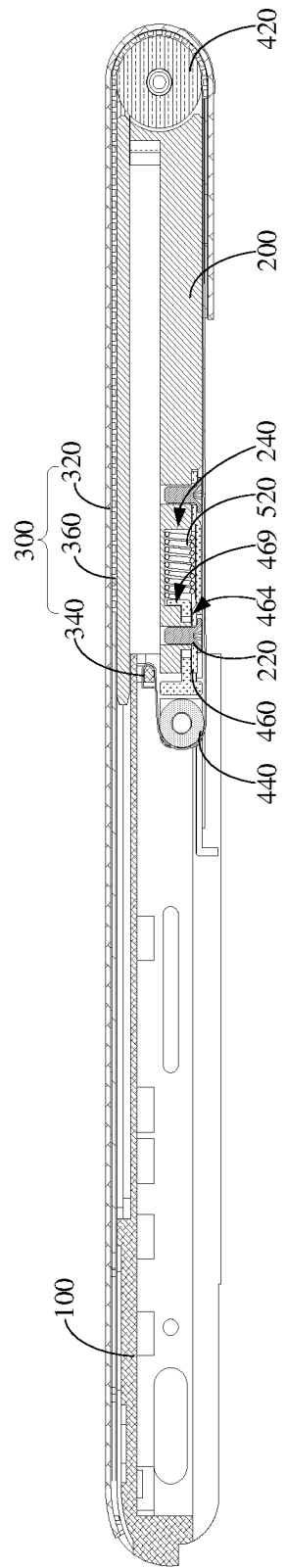
FIG. 6 is a schematic structural diagram of the electronic device illustrated in FIG. 5 with a second driving member displaced.

For example, reference can be made to FIG. 5 and FIG. 6, where FIG. 6 is a schematic structural diagram of the electronic device illustrated in FIG. 5 with a second driving member displaced. The driving mechanism 400 may further include a first bracket, such as a first bracket 460. The first driving member 420 may be fixedly connected with the second carrier 200, and the second driving member 440 may be movably connected with the second carrier 200 through the first bracket 460. The adjustment mechanism 500 may include a first elastic member 520. The first elastic member 520 is disposed between the first driving member 420 and the second driving member 440, and the first elastic member 520 has one end abutting against the first bracket 460 and another end abutting against the second carrier 200. The first elastic member 520 is elastically deformed to drive the first bracket 460 to move in a direction away from the first driving member 420, thereby increasing a distance between the first driving member 420 and the second driving member 440.

The first elastic member 520 may be a compression spring or other elastically deformable device, and a maximum deformation amount of the first elastic member 520 is positively related to a slackness degree of the flexible screen assembly 300. It can be understood that the maximum deformation amount of the first elastic member 520 is set according to the slackness degree of the flexible screen assembly 300. When the flexible screen assembly 300 is slacker, the maximum deformation amount of the first elastic member 520 becomes larger. For example, a test can be performed according to usage of the flexible screen assembly 300 to obtain the slackness degree of the flexible screen assembly 300 during service life of the flexible screen assembly 300, in other words, how much the maximum slackness amount of the flexible screen assembly 300 can reach. Then the maximum deformation amount of the first elastic member 520 is set according to the maximum slackness amount of the flexible screen assembly 300, such that the maximum deformation amount of the first elastic member 520 is sufficient to absorb the maximum slackness of the flexible screen assembly 300.

It can be understood that when the flexible screen assembly 300 is slack, the first elastic member 520 is configured to push the first bracket 460 to move to increase the distance between the first driving member 420 and the second driving member 440, thereby offsetting a length variation of the flexible screen assembly 300 caused by a decreased stress value, such that a current tension value of the flexible screen assembly 300 is restored to be within the preset range and then the flatness of the flexible screen assembly 300 is ensured.

In addition, the elastic mechanism in implementations of the present disclosure cannot only absorb a slackness amount of the flexible screen assembly 300 after multiple movements of the flexible screen assembly 300, but also absorb a slackness amount caused by improper mounting of the flexible screen assembly 300. It can be understood that when the flexible screen assembly 300 is mounted, the flexible screen assembly 300 mounted may not meet the requirement that the current tension value is within the preset range. Here, the first elastic member 520 can drive the first bracket 460 to move to increase the distance between the first driving member 420 and the second driving member 440, thereby absorbing the slackness amount of the flexible screen assembly 300 due to improper mounting. It can also be understood that a mounting difficulty of the flexible screen assembly 300 can be reduced due to arrangement of the first elastic member 520. In other words, due to the arrangement of the first elastic member 520, an elastic force of the first elastic member 520 can keep a stress value of the flexible screen assembly 300 within the preset range, regardless of slackness of the flexible screen assembly 300 caused by any reason.

It can be understood that in an initial state (such as a state after the whole device is mounted), the first elastic member 520 is compressed. It is assumed that the first elastic member 520 has a compression length of x, and the flexible screen assembly 300 has a slackness length of h. Here, the first elastic member 520 can be elastically deformed, the first bracket 460 is driven to move under the elastic force of the first elastic member 520, and the second driving member 440 is driven to move in the direction away from the first driving member 420. Since the second driving member 440 is limited by the flexible screen assembly 300, a distance that the second driving member 440 can move is equal to or slightly larger than slackness length h of the flexible screen assembly 300. When the second driving member 440 moves, the first elastic member 520 can absorb the slackness length of the flexible screen assembly 300, such that the stress value of the flexible screen assembly 300 is restored to be within the preset range. Here, the compression length of the first elastic member 520 is equal to or slightly smaller than x-h, and at the same time, the first elastic member 520 continues to maintain elasticity, so as to absorb the slackness amount caused by the decreased stress value and slackness of the flexible screen assembly 300.

Figure 7:
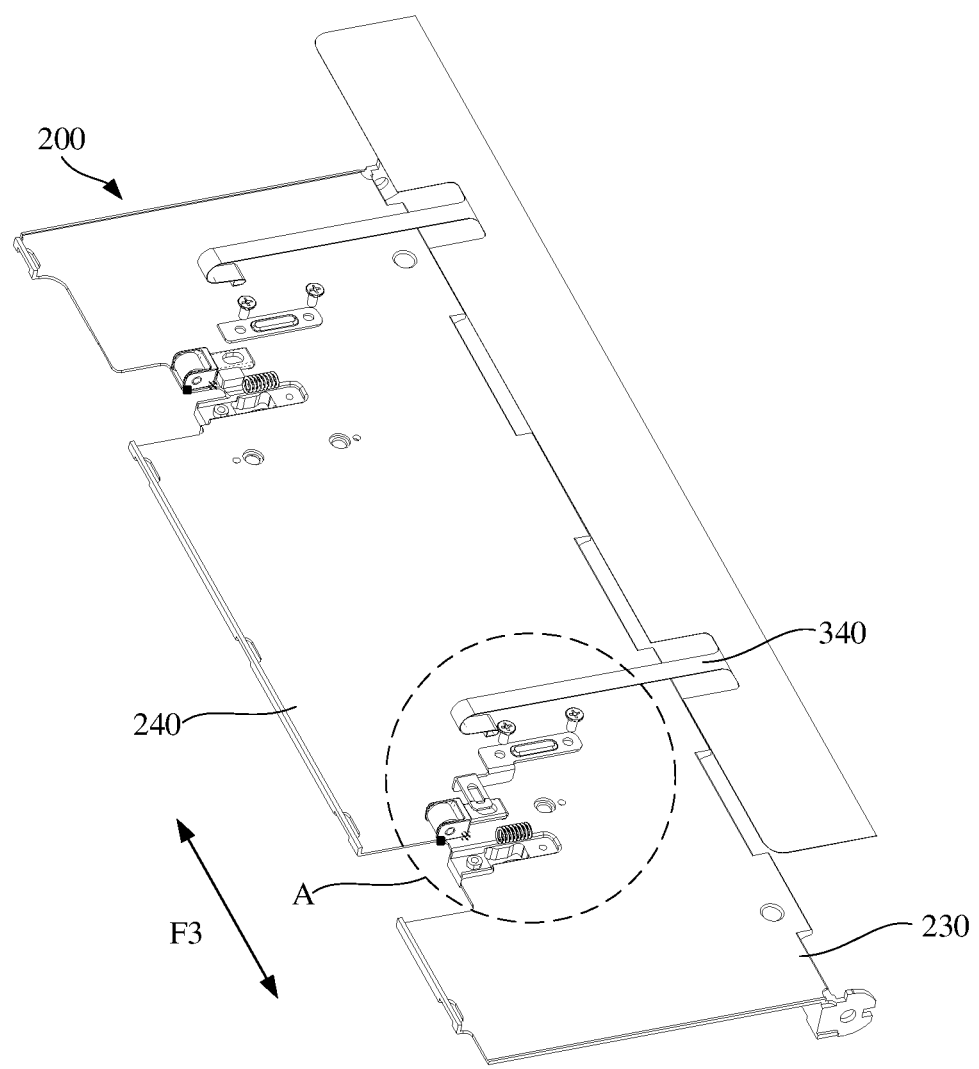
FIG. 7 is an exploded schematic structural diagram of a second carrier and a flexible screen assembly in the electronic device illustrated in FIG. 4.
Figure 8:
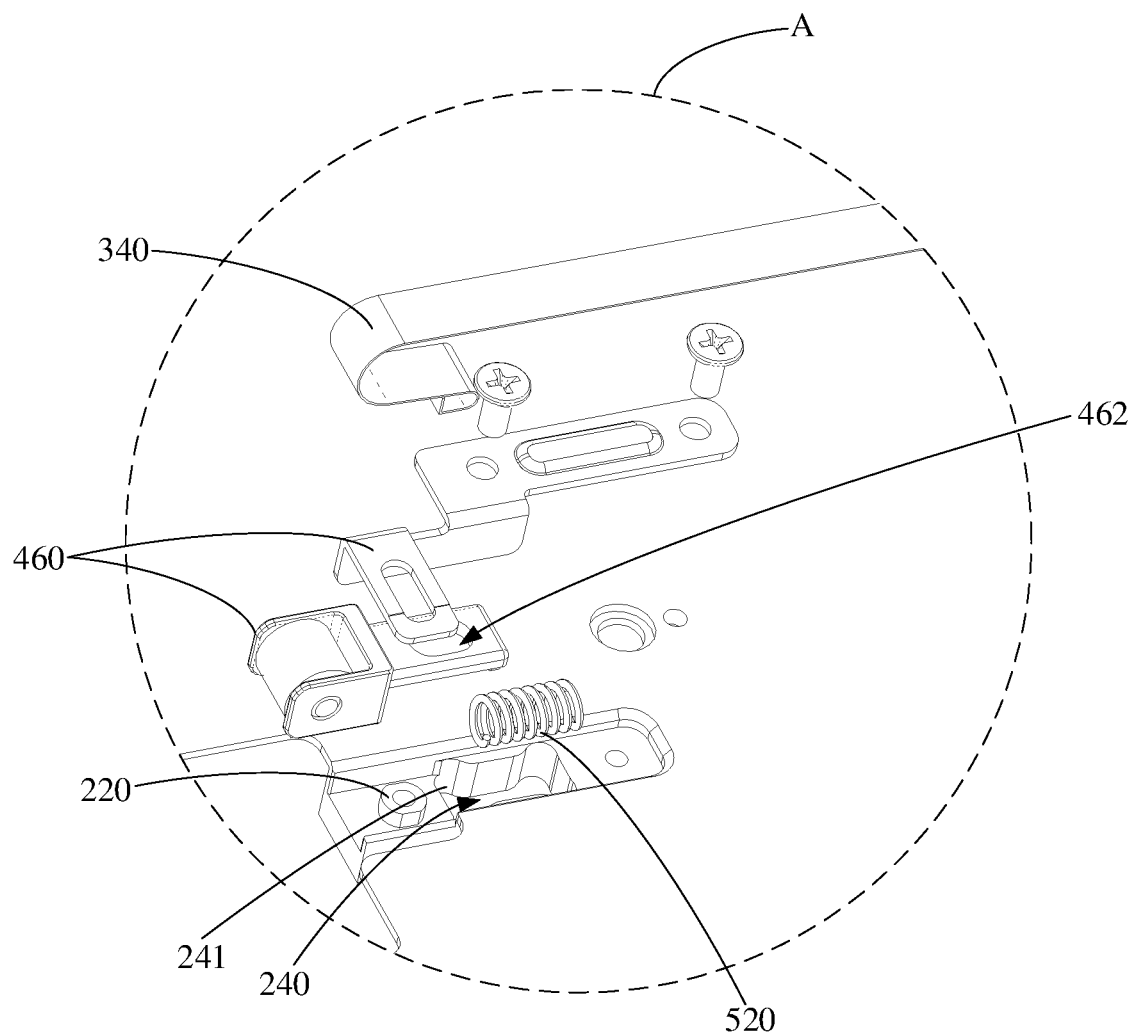
FIG. 8 is an enlarged schematic structural diagram of the second carrier and the flexible screen assembly at region A in FIG. 7.

Reference can continue to be made to FIG. 7 and FIG. 8, where FIG. 7 is an exploded schematic structural diagram of a second carrier and a flexible screen assembly in the electronic device illustrated in FIG. 4, and FIG. 8 is an enlarged schematic structural diagram of the second carrier and the flexible screen assembly at region A in FIG. 7. The second carrier 200 is provided with a protrusion 220, and the first bracket 460 defines a through hole 462. The first bracket 460 is sleeved on the protrusion 220 through the through hole 462, or the protrusion 220 passes through the through hole 462. The through hole 462 has a size larger than the protrusion 220 in the movement direction of the flexible screen assembly 300, such that a first movement space 464 is defined between the first bracket 460 and the protrusion 220.

The first movement space 464 is smaller than the maximum deformation amount when the first elastic member 520 is elastically deformed, so as to ensure that the first elastic member 520 is always in a compressed state under an abutting force of the first bracket 460 and an abutting force of the second carrier 200, such that the first elastic member 520 in the compressed state always has an elastic force on the first bracket 460, to make the stress value of the flexible screen assembly 300 always within the preset range. It can be understood that when the first movement space 464 is too large, the first elastic member 520 may fail to abut between the second carrier 200 and the first bracket 460 after being completely released, such that the elastic force of the first elastic member 520 on the first bracket 460 decreases or disappears, resulting in a slack or wrinkled flexible screen assembly 300.

Figure 9:
FIG. 9 is a partial schematic structural diagram of an electronic device provided in implementations of the present disclosure.
Figure 10:
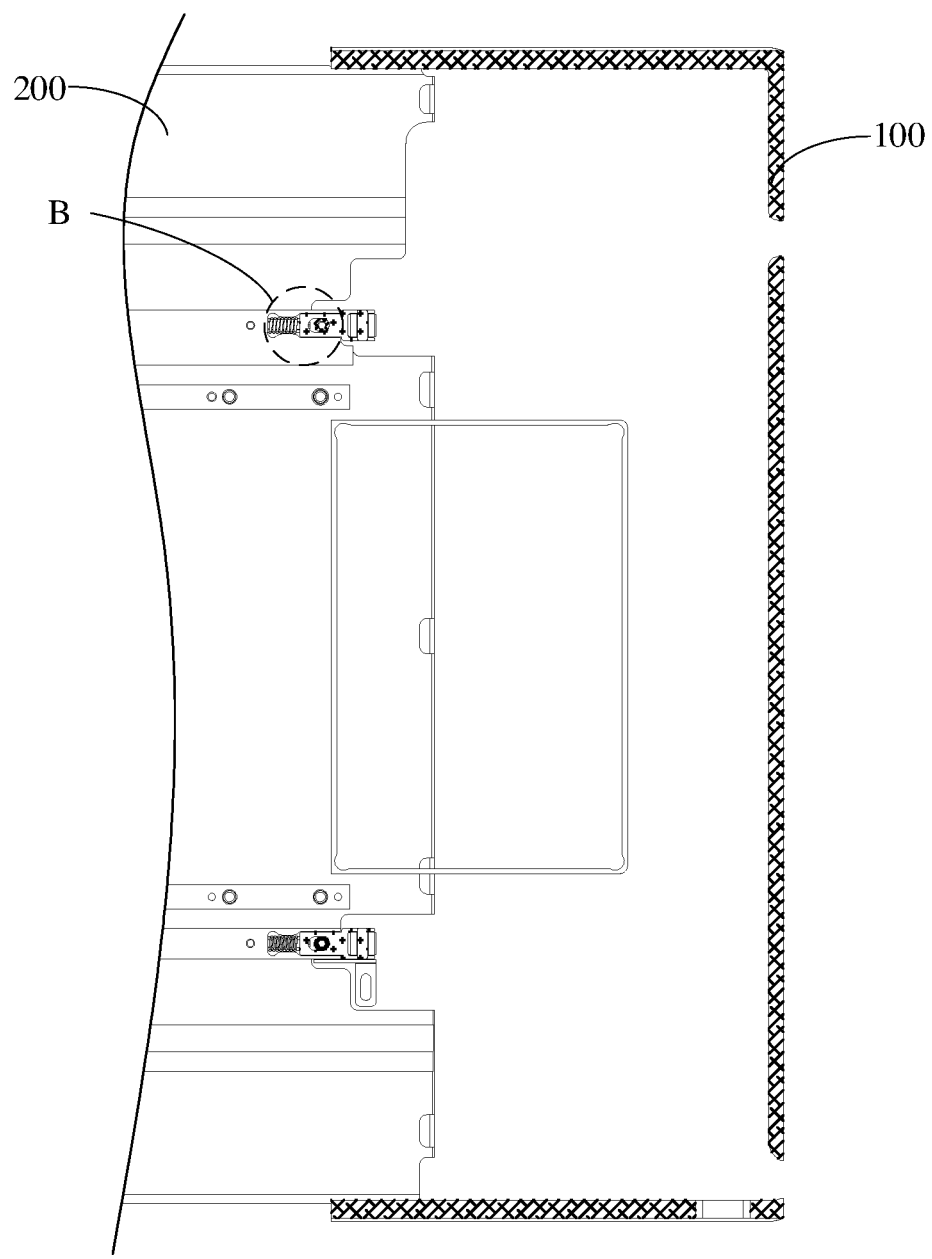
FIG. 10 is a schematic structural diagram of the electronic device illustrated in FIG. 9 taken in direction P3-P3.
Figure 11:
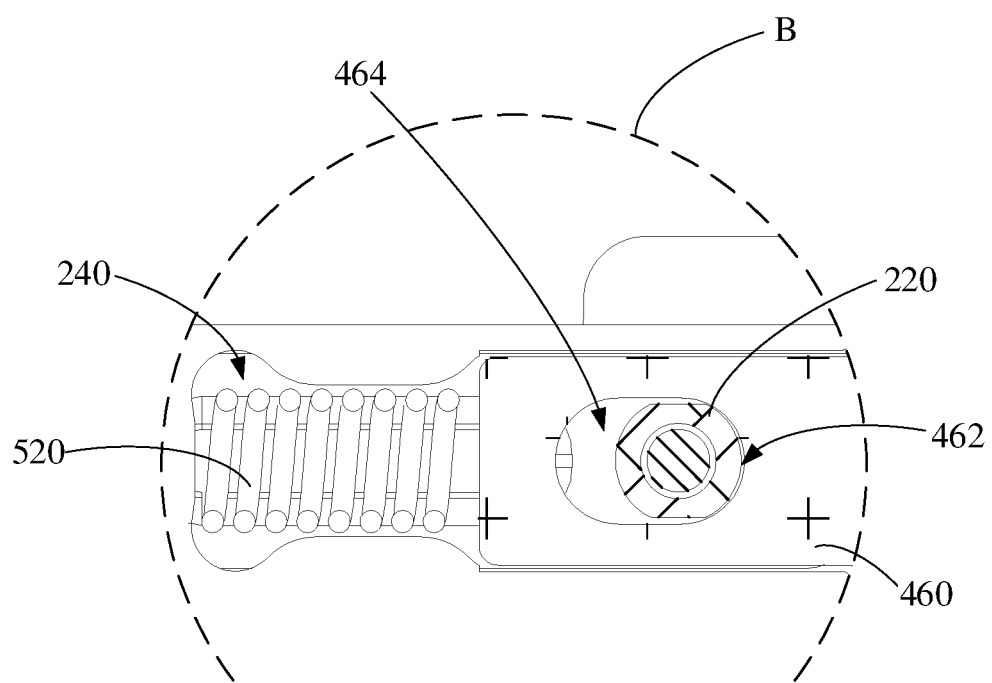
FIG. 11 is an enlarged schematic structural diagram of the electronic device at region B in FIG. 10.
Figure 12:
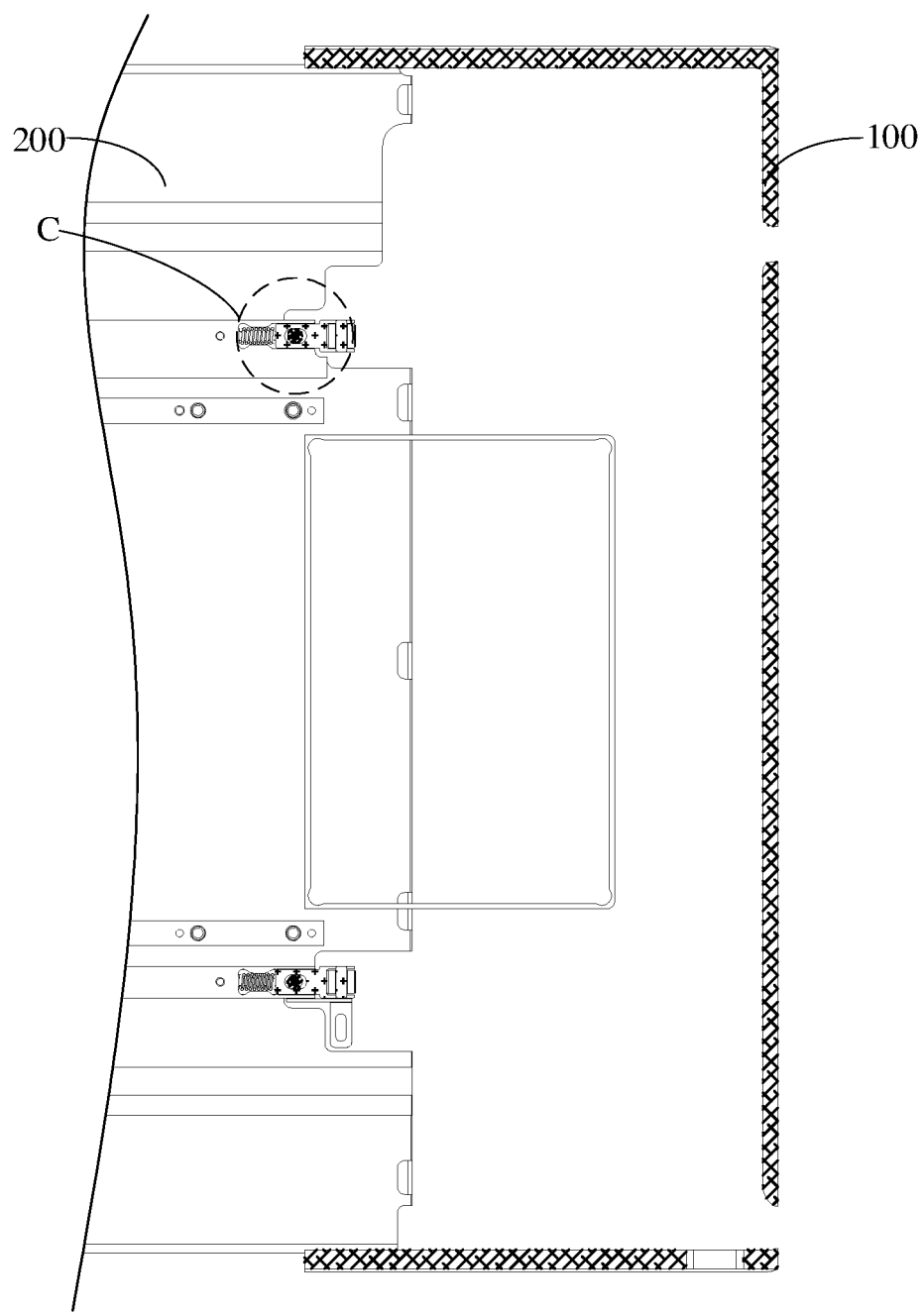
FIG. 12 is a schematic structural diagram of the electronic device illustrated in FIG. 10 with a second driving member displaced.
Figure 13:
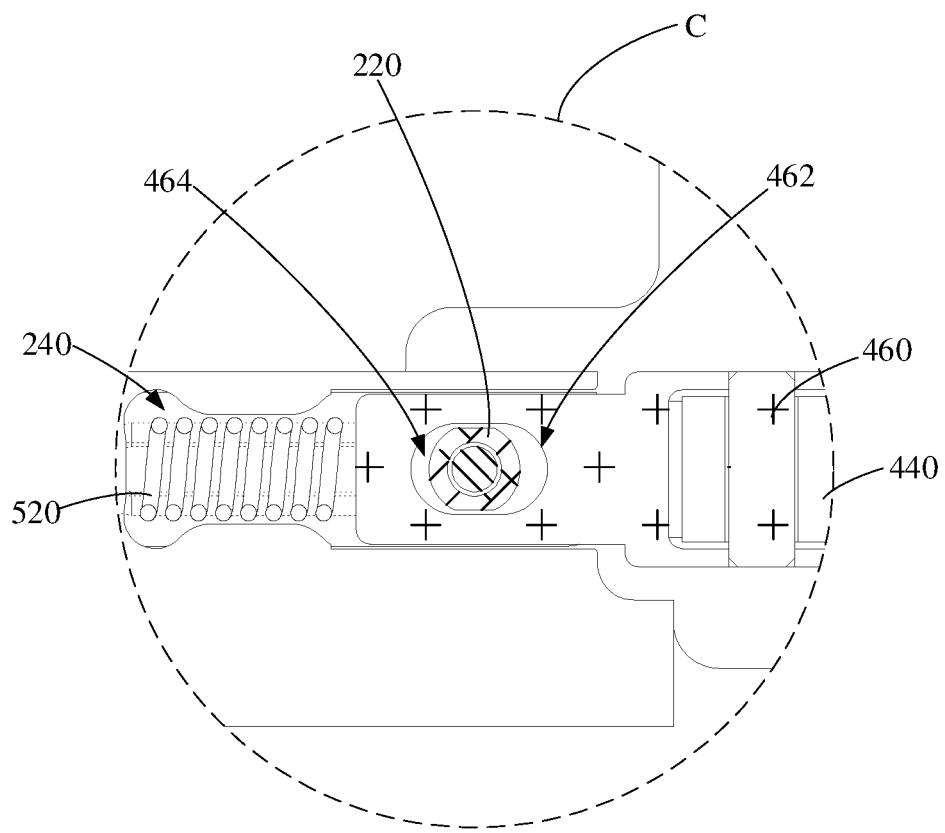
FIG. 13 is an enlarged schematic structural diagram of the electronic device at region C in FIG. 12.

Reference can be made to FIG. 9 to FIG. 13 together, where FIG. 9 is a partial schematic structural diagram of an electronic device provided in implementations of the present disclosure, FIG. 10 is a schematic structural diagram of the electronic device illustrated in FIG. 9 taken in direction P3-P3, FIG. 11 is an enlarged schematic structural diagram of the electronic device at region B in FIG. 10, FIG. 12 is a schematic structural diagram of the electronic device illustrated in FIG. 10 with a second driving member displaced, and FIG. 13 is an enlarged schematic structural diagram of the electronic device at region C in FIG. 12. A movement process of the second driving member 440 is described below with reference to the accompanying drawings. In the initial state (such as the state after the whole device is mounted), the first elastic member 520 is compressed, and here the first bracket 460 is in a first position relative to the protrusion 220. When the flexible screen assembly 300 is slack, the first elastic member 520 is elastically deformed to apply an elastic force to the first bracket 460. The first bracket 460 moves within the first movement space 464 under the elastic force of the first elastic member 520, such that the first bracket 460 moves to a second position relative to the protrusion 220. When the first bracket 460 moves, the first bracket 460 is configured to drive the second driving member 440 to move in the direction away from the first driving member 420 to increase the distance between the first driving member 420 and the second driving member 440, and absorbs the slackness amount of the flexible screen assembly 300. In order to make the first bracket 460 move in a preset direction without deflection, the through hole 462 in implementations of the present disclosure has a strip-shaped structure and abuts with the protrusion 220 in all directions except the movement direction of the flexible screen assembly 300, so as to limit the movement direction of the first bracket 460, such that the first bracket 460 moves in the movement direction of the flexible screen assembly 300, and the flatness of the flexible screen assembly 300 can be prevent from being affected due to the deflection of the first bracket 460 when the first bracket 460 moves.

Figure 14:
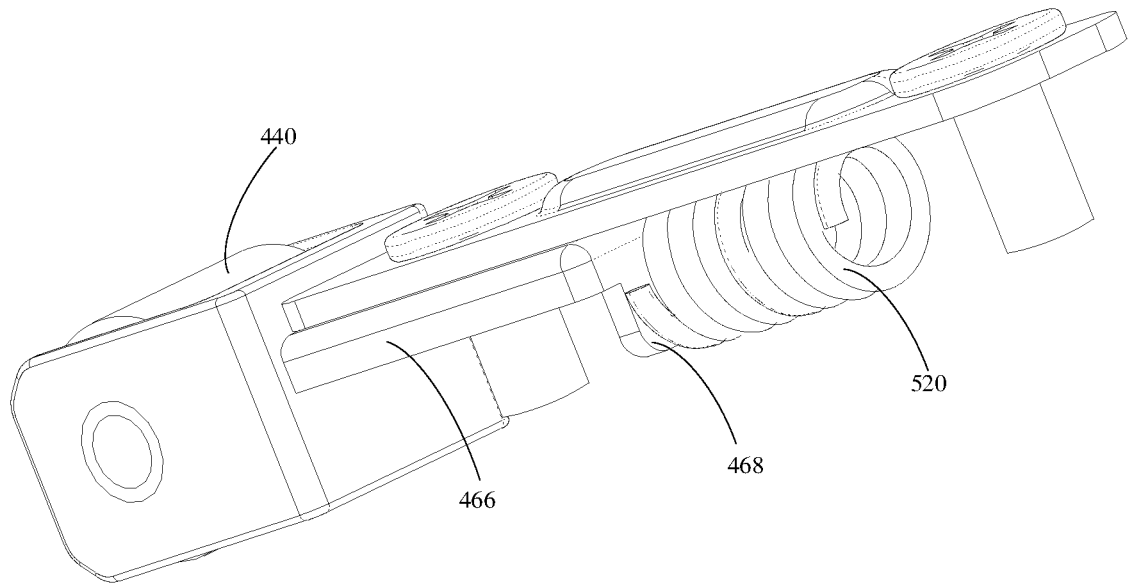
FIG. 14 is a schematic structural diagram of a first bracket, a second driving member, and a first elastic member in the second carrier and the flexible screen assembly illustrated in FIG. 8.

Reference can be made to FIG. 4, FIG. 8, FIG. 11, and FIG. 14, where FIG. 14 is a schematic structural diagram of a first bracket, a second driving member, and a first elastic member in the second carrier and the flexible screen assembly illustrated in FIG. 8. In implementations of the present disclosure, the second carrier 200 defines an accommodating groove 240, and the accommodating groove 240 can be used to accommodate the first elastic member 520 and a part of the first bracket 460 which abuts against the first elastic member 520. For example, the second carrier 200 has a bottom wall and a side wall, and the side wall is disposed around a periphery of the bottom wall to define the accommodating groove 240. The first bracket 460 has a straight portion 466 and a bending portion 468, the through hole 462 is defined at the straight portion 466, and the bending portion 468 is bendably disposed relative to the straight portion 466. The bending portion 468 is located in the accommodating groove 240, and a second movement space 415 is defined between the bending portion 468 and a groove wall (or a side wall) 241 of the accommodating groove 240. The first elastic member 520 is accommodated in the accommodating groove 240, one end of the first elastic member 520 abuts against the bending portion 468, and the other end of the first elastic member 520 abuts against the groove wall (or the side wall) 241 of the accommodating groove 240. When the flexible screen assembly 300 is slack, the first elastic member 520 is elastically deformed, so as to push the bending portion 468 to compress the second movement space 415. Here, the straight portion 466 moves in the first movement space 464, such that a relative position between the first bracket 460 and the second carrier 200 is changed, the distance between the first driving member 420 and the second driving member 440 is increased, and the slackness amount of the flexible screen assembly 300 is absorbed.

The first elastic member 520 in implementations of the present disclosure is disposed on the second carrier 200, and compared with the first elastic member 520 being disposed on the first carrier, a space occupied by the first carrier 100 can be reduced, such that more devices can be disposed on the first carrier 100.

It should be noted that when the second driving member 440 is movably connected with the second carrier 200, and the first driving member 420 may also be movably connected with the second carrier 200. For example, the first driving member 420 can be movably connected with the second carrier 200 through a second bracket, one end of the first elastic member 520 abuts against the first bracket 460, and the other end of the first elastic member 520 abuts against the second bracket. The first elastic member 520 is elastically deformed to drive the first bracket 460 to move in the direction away from the first driving member 420 and drive the second bracket to move in a direction away from the second driving member 440, thereby increasing the distance between the first driving member 420 and the second driving member 440. The second bracket has the same structure as the first bracket, which will not be repeated here. The second bracket may also have a different structure from the first bracket 460, as long as the second bracket is movable.

For another example, the adjustment mechanism can further include a second elastic member. The first driving member 420 can be movably connected with the second carrier 200 through the second bracket, one end of the second elastic member abuts against the second bracket, and the other end of the second elastic member abuts against the second carrier 200. The second elastic member is elastically deformed to drive the second bracket to move in the direction away from the second driving member 440. The second elastic member may have the same structure as the first elastic member and have the same connection relationships with other components as the first elastic member, which will not be repeated here. It should be noted that the second elastic member may also have a different structure from the first elastic member and have different connection relationships with other components from the first elastic member.

It should also be noted that a structure of the adjustment mechanism is not limited to this. For example, the adjustment mechanism may also include only the second elastic member. For example, the first driving member 420 is movably connected with the second carrier 200 through the second bracket, and the second driving member 440 is fixedly connected with the second carrier 200. The second elastic member is elastically deformed to drive the first driving member 420 to move in the direction away from the second driving member 440, so as to increase the distance between the first driving member 420 and the second driving member 440.

In implementations of the present disclosure, the adjustment mechanism can also be used to automatically adjust the distance between the first driving member 420 and the second driving member 440 according to the current tension value of the flexible screen assembly 300, such that the tension value of the flexible screen assembly 300 is within the preset range. It can be understood that when the tension value of the flexible screen assembly 300 is too great, the flexible screen assembly 300 may be broken, and when the tension value of the flexible screen assembly 300 is too little, the flexible screen assembly 300 may be wrinkled. The preset range may be a range preset according to characteristics of the flexible screen assembly 300, such that when the tension value of the flexible screen assembly 300 is within the preset range, the flexible screen assembly 300 can neither be broken nor wrinkled.

For example, reference can continue to be made to FIG. 3, the electronic device 20 can be provided with a detecting mechanism 600, and a processor 700 of the electronic device 20 can be connected with the detecting mechanism 600 and the adjustment mechanism 500 respectively. The current tension value of the flexible screen assembly 300 is detected by the detecting mechanism 600, and then a detection result is fed back to the processor 700. For example, the detecting mechanism 600 may be a tension sensor. When the current tension value of the flexible screen assembly 300 is less than the minimum value within the preset range, the processor 700 can control the adjustment mechanism 500 to drive the first movement structure to move in the direction away from the second driving member 440, so as to increase the distance between the first driving member 420 and the second driving member 440, and then absorb the length variation of the flexible screen assembly 300 caused by an insufficient tension value, such that the tension value of the flexible screen assembly 300 is within the preset range. When the current tension value of the flexible screen assembly 300 is greater than the maximum value within the preset range, the processor 700 can control the adjustment mechanism 500 to drive the first movement structure to move in a direction close to the second driving member 440, so as to reduce the distance between the first driving member 420 and the second driving member 440, and then relieve a situation that the flexible screen assembly 300 is too tight due to an excessive tension value of the flexible screen assembly 300, such that the tension value of the flexible screen assembly 300 is within the preset range.

For another example, the second driving member 440 can be movably connected with the second carrier 200 through a second movement structure. When the current tension value of the flexible screen assembly 300 is less than the minimum value within the preset range, the processor 700 can control the adjustment mechanism 500 to drive the second movement structure to move in the direction away from the first driving member 420, so as to increase the distance between the first driving member 420 and the second driving member 440, such that the tension value of the flexible screen assembly 300 is within the preset range. When the current tension value of the flexible screen assembly 300 is greater than the maximum value within the preset range, the processor 700 can control the adjustment mechanism 500 to drive the second movement structure to move in a direction close to the first driving member 420, so as to reduce the distance between the first driving member 420 and the second driving member 440, such that the tension value of the flexible screen assembly 300 is within the preset range.

The first driving member 420 and the second driving member 440 both can be movably connected with the second carrier 200, and the processor 700 can control the adjustment mechanism 500 to drive the first driving member 420 and the second driving member 440 to move simultaneously to increase or decrease the distance between the first driving member 420 and the second driving member 440.

In this scheme, by using the adjustment mechanism, the first driving member adjusted and the second driving member adjusted with an unchanged relative position, and the flexible screen assembly, not only can the display region of the electronic device 20 be adjustable, but also the flatness of the flexible screen assembly 300 can be ensured in various states.

It should be noted that an adjustment manner in the present disclosure is not limited to this. For example, the adjustment mechanism can adjust a relative position of a position where a first end 301 of the flexible screen assembly 300 is connected with the first carrier 100 on the first carrier 100. The first end 301 of the flexible screen assembly 300 can be movably connected with the first carrier 100, and when the flexible screen assembly 300 is slack, the adjustment mechanism 500 controls the first end 301 of the flexible screen assembly 300 to move in the direction away from the first driving member 420, so as to absorb the slackness amount of the flexible screen assembly 300, such that the flexible screen assembly 300 is in the tensioned state. Alternatively, the second end 302 of the flexible screen assembly 300 can be movably connected with the first carrier 100, and when the flexible screen assembly 300 is slack, the adjustment mechanism 500 controls the second end 302 of the flexible screen assembly 300 to move in the direction away from the first driving member 420, so as to absorb the slackness amount of the flexible screen assembly 300, such that the flexible screen assembly 300 is in the tensioned state.

Figure 15:
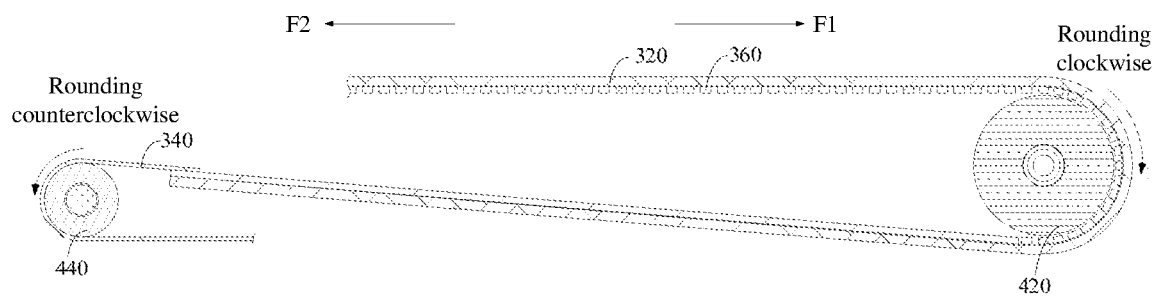
FIG. 15 is a schematic structural diagram of a flexible screen assembly, a first driving member, and a second driving member in the electronic device illustrated in FIG. 4 in other implementations of the present disclosure.

It should be noted that an arrangement manner of the flexible screen assembly 300 is not limited to this. For example, reference can be made to FIG. 15, which is a schematic structural diagram of a flexible screen assembly, a first driving member, and a second driving member in the electronic device illustrated in FIG. 4 in other implementations of the present disclosure. A direction in which the flexible screen assembly 300 is wrapped around the first driving member 420 is opposite to a direction in which the flexible screen assembly 300 is wrapped around the second driving member 440. For example, the flexible screen assembly 300 may be wrapped around the first driving member 420 clockwise and the flexible screen assembly 300 may be wrapped around the second driving member 440 counterclockwise. The first driving member 420 and the second driving member 440 may also rotate relative to the second carrier 200, and a rotation direction of the first driving member 420 is different from a rotation direction of the second driving member 440. For example, when the first carrier 100 moves away from the second carrier 200, the first driving member 420 is configured to push the flexible screen assembly 300 to move in first direction F1. When the flexible screen assembly 300 moves, the flexible screen assembly 300 is configured to drive the first driving member 420 to rotate around the first fixed shaft counterclockwise and drive the second driving member 440 to rotate around the second fixed shaft clockwise, so as to extend a part of the flexible screen assembly 300 to the outside of the electronic device 20 to expand a display region of the flexible screen assembly 300. When the first carrier 100 and the second carrier 200 move close to each other, the second driving member 440 is configured to push the flexible screen assembly to move in second direction F2. When the flexible screen assembly 300 moves, the flexible screen assembly 300 is configured to drive the second driving member 440 to rotate around the second fixed shaft counterclockwise and drive the first driving member 420 to rotate around the first fixed shaft clockwise, so as to retract a part of the flexible screen assembly 300 to the inside of the electronic device 20, thereby reducing the display region of the flexible screen assembly 300 and reducing the overall size of the electronic device 20.

Figure 16:
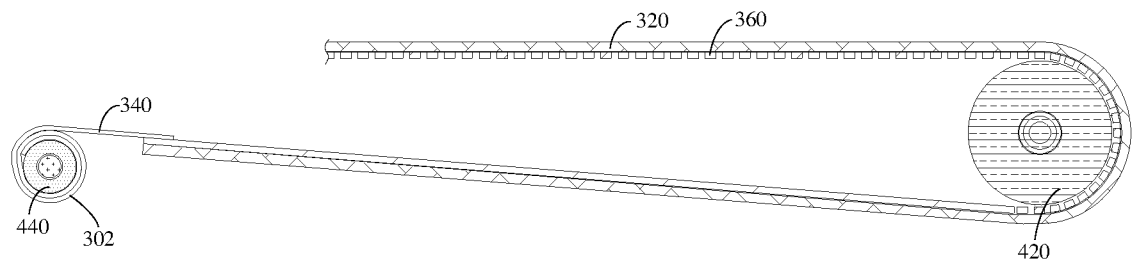
FIG. 16 is a schematic structural diagram of a flexible screen assembly, a first driving member, and a second driving member in the electronic device illustrated in FIG. 4 in other implementations of the present disclosure.

It should also be noted that a connection manner of the second end 302 of the flexible screen assembly 300 is not limited to this. For example, reference can be made to FIG. 16, which is a schematic structural diagram of a flexible screen assembly, a first driving member, and a second driving member in the electronic device illustrated in FIG. 4 in other implementations of the present disclosure. The flexible screen assembly 300 is wrapped around the first driving member 420 and the second driving member 440 in turn, and the second end 302 of the flexible screen assembly 300 is connected with the second driving member 440. The second driving member 440 can rotate to wind or release the flexible screen assembly 300. The adjustment mechanism 500 can be used to adjust the first driving member 420 and the second driving member 440 to increase the distance between the first driving member 420 and the second driving member 440, thereby absorbing the slackness amount of the flexible screen assembly 300, which is easy to operate. In addition, controlling of the winding or the releasing of the flexible screen assembly 300 by the second driving member 440 and adjusting of the tightness of the flexible screen assembly 300 are separate, and compared with controlling of the winding or the releasing of the flexible screen assembly 300 and the tightness of the flexible screen assembly 300 by the second driving member 440 being simultaneous, an influence of adjusting the tightness of the flexible screen assembly 300 on controlling of a winding or releasing process of the flexible screen assembly 300 can be reduced. The adjustment mechanism 500 in implementations of the present disclosure has the same structure as the adjustment mechanism 500 in the above implementations of the present disclosure, which will not be repeated here.

Reference can continue to be made to FIG. 4 and FIG. 5, and during the movement of the flexible screen assembly 300, a part of the flexible screen assembly 300 is always accommodated in the electronic device 20. In order to simplify a structure of the flexible screen assembly 300, the part of the flexible screen assembly 300 accommodated in the electronic device 20 may be configured as a part for no picture display, or may be configured as a part without a flexible display module. For example, the flexible screen assembly 300 may include a flexible display module 320 and a driving belt 340. The flexible display module 320 has a first end 321 connected with an external surface 101 of the first carrier 100, the flexible display module 320 has a second end 322 connected with a first end 341 of the driving belt 340, and the flexible display module 320 is wrapped around the first driving member 420. The first end 321 of the flexible display module 320 serves as the first end 301 of the flexible screen assembly 300. A second end 342 of the driving belt 340 is connected with an internal surface 102 of the first carrier 100, and the driving belt 340 is wrapped around the second driving member 440. The second end 342 of the driving belt 340 serves as the second end 302 of the flexible screen assembly 300.

When the first carrier 100 and the second carrier 200 move away from each other, the first driving member 420 is configured to push the flexible display module 320 to move in first direction F1 and drive the driving belt 340 to move in first direction F1, such that a first part of the flexible display module 320 extends outside the electronic device 20 to display a picture together with a second part of the flexible display module 320. A display content of the first part of the flexible display module 320 may be the same as or different from a display content of the second part of the flexible display module 320. Here, the driving belt 340 is accommodated in the electronic device 20, and a distance between the first end 341 of the driving belt 340 and the second driving member 440 is larger than a distance between the second end 342 of the driving belt 340 and the second driving member 440. When the first carrier 100 and the second carrier 200 move close to each other, the second driving member 440 is configured to push the driving belt 340 to move in second direction F2 and drive the flexible display module 320 to move in second direction F2, such that the first part of the flexible display module 320 retracts inside the electronic device 20, and only the second part of the flexible display module 320 is exposed beyond the electronic device 20. Here, the driving belt 340 is still accommodated in the electronic device 20, and the distance between the first end 341 of the driving belt 340 and the second driving member 440 is smaller than the distance between the second end 342 of the driving belt 340 and the second driving member 440.

When the first part of the flexible display module 320 retracts inside the electronic device 20, the electronic device 20 may control the first part of the flexible display module 320 to be in a sleep state to save power, or control the first part of the flexible display module 320 to be in an operating state to meet other requirements of a user.

Figure 17:
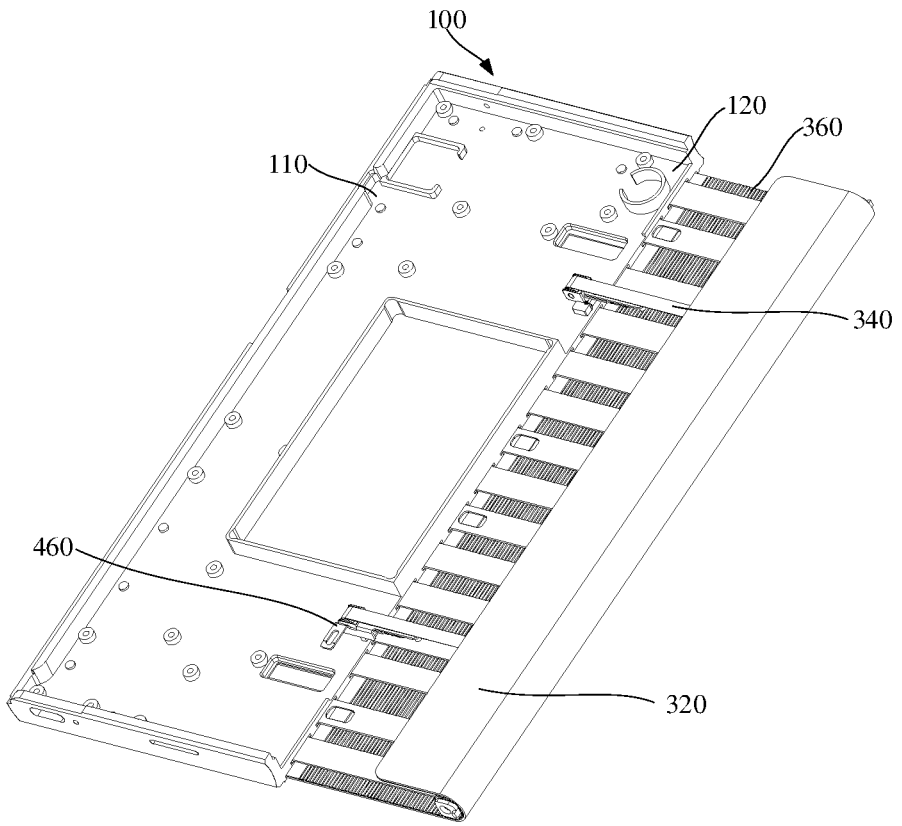
FIG. 17 is a schematic structural diagram of a first carrier and a flexible screen assembly in the electronic device illustrated in FIG. 1.

Reference can be made to FIG. 17, which is a schematic structural diagram of a first carrier and a flexible screen assembly in the electronic device illustrated in FIG. 1. The flexible screen assembly 300 may include a flexible display module 320, a driving belt 340, and a support member 360. The support member 360 is disposed on a non-display surface of the flexible display module 320. The support member 360 can support the flexible display module 320 to improve flatness of the flexible display module 320, and can also separate the flexible display module 320 from other components to protect the flexible display module 320. The first end 341 of the driving belt 340 is connected with the support member 360. A first end 361 of the support member 360 is connected with the first carrier 100. The first end 361 of the support member 360 serves as the first end 301 of the flexible screen assembly 300. Compared with a connection between the driving belt 340 and the flexible display module 320, the flexible display module 320 can be prevented from being directly subjected to a pulling force of the driving belt 340 through a connection between the driving belt 340 and the support member 360, and the flexible display module 320 can be further protected. A part of the support member 360 that is located on the non-display surface of the first part of the flexible display module 320 may include multiple support bars arranged at intervals, and two adjacent support bars are connected with each other. Compared with a plate-like support structure directly adopted, this structure where the multiple support bars are arranged at intervals and two adjacent support bars are connected with each other, can make the part of the support member 360 that is located on the non-display surface of the first part of the flexible display module 320 easy to be bent, so as to reduce a difficulty of disposing the support member 360 around the first driving member 420, or improve fit of the support member 360 is wrapped around the first driving member 420. A structure of the part of the support member 360 that is located on the non-display surface of the second part of the flexible display module 320 may be the same as or different from a structure of the part that is located on a non-display surface of the first part of the flexible display module 320. For example, the part of the support member 360 that is located on the non-display surface of the second part of the flexible display module 320 may has a plate-like structure.

The number of the second driving member 440 may be one or more. For example, as illustrated in FIG. 7, the number of the second driving member 440 is two, and two second driving members 440 are arranged at an interval, for example one second driving member 440 and the other second driving member 440 are respectively disposed close to two opposite ends of the second carrier 200 in length direction F3 of the electronic device 20. Here, the number of the driving belt 340 may be two, one driving belt 340 is wrapped around one second driving member 440, and two second driving members 440 are connected with the second end 322 of the flexible display module 320 together, such that when the first carrier 100 and the second carrier 200 move close to each other, the first carrier 100 and the second carrier 200 pull the flexible display module 320 to move in second direction F2 together. Therefore, the flexible display module 320 is more stable during the movement of the flexible display module 320, and the flexible display module 320 is avoided from being damaged due to deflection of the flexible display module 320 during the movement of the flexible display module 320.

In implementations of the present disclosure, the relative movement between the first carrier 100 and the second carrier 200 can be realized by manual driving, for example, the first carrier 100 and the second carrier 200 can be pulled by two hands of a user to move relative to each other.

Figure 18:
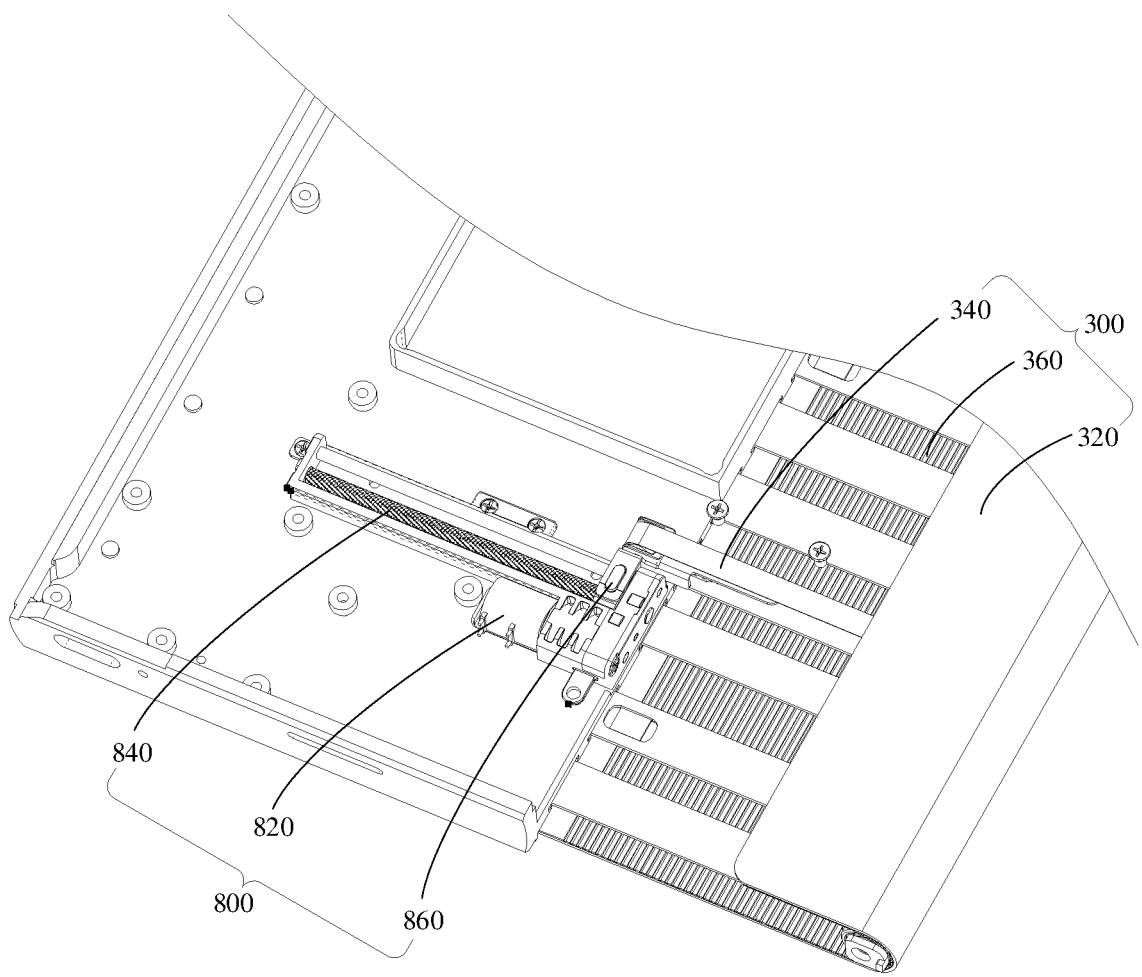
FIG. 18 is a partial schematic structural diagram of an electronic device provided in implementations of the present disclosure.

The relative movement between the first carrier 100 and the second carrier 200 can also be realized by electric driving. The electronic device 20 can be further provided with a driving apparatus 800, and the driving apparatus 800 is configured to drive the second carrier 200 to move relative to the first carrier 100. The driving apparatus 800 may include a driving motor (or an electric motor) and a transmission structure, the transmission structure is connected with the first carrier 100 and/or the second carrier 200 in a transmission manner, and the driving motor is configured to drive the transmission structure to move. When the transmission structure moves, the transmission structure can drive the first carrier 100 and/or the second carrier 200 to move together to realize the relative movement of the first carrier 100 and the second carrier 200. The transmission structure may be a transmission screw rod or a transmission gear. For example, reference can be made to FIG. 18, which is a partial schematic structural diagram of an electronic device provided in implementations of the present disclosure, and the driving apparatus 800 may include a driving motor 820, a transmission screw rod 840, and a connecting member 860. The connecting member 860 is connected with the transmission screw rod 840 in a transmission manner, and the driving motor 820 is configured to drive the transmission screw rod 840 to rotate to drive the connecting member 860 to move. When the connecting member 860 moves, the connecting member 860 is configured to drive the second carrier 200 to move.

Figure 19:
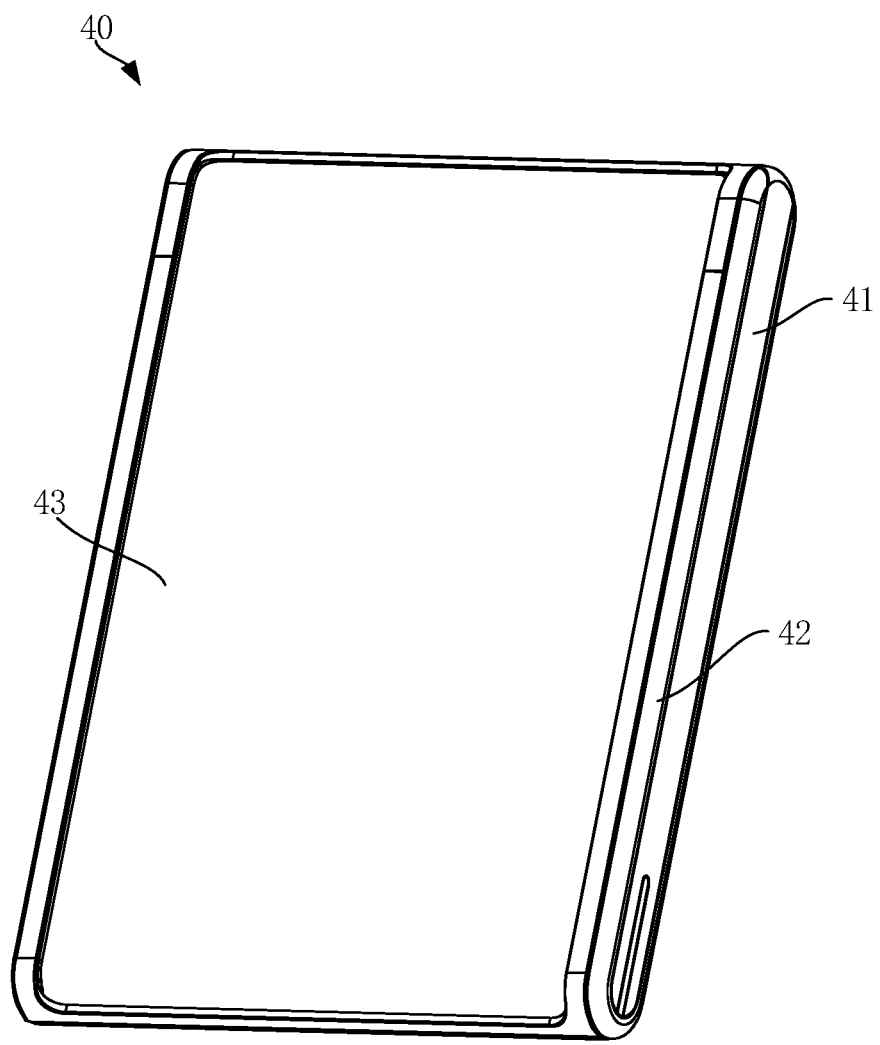
FIG. 19 is a schematic structural diagram of an electronic device provided in other implementations of the present disclosure.
Figure 20:
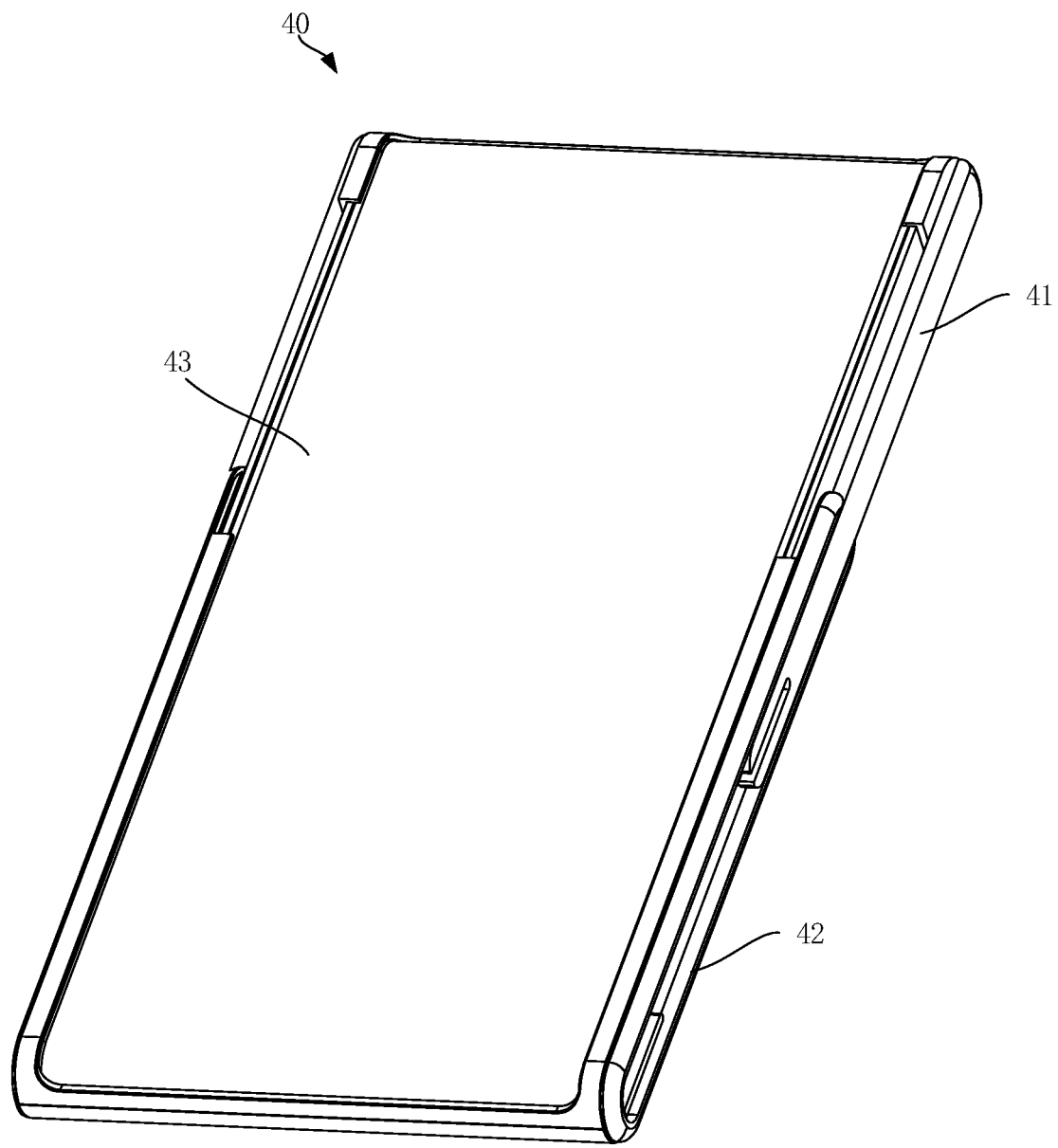
FIG. 20 is a fifth schematic structural diagram of an electronic device provided in other implementations of the present disclosure.

It should be noted that a pulling manner of the electronic device 20 is not limited to this. For example, reference can be made to FIG. 19 and FIG. 20, where FIG. 19 is a schematic structural diagram of an electronic device provided in other implementations of the present disclosure, and FIG. 20 is a schematic structural diagram of an electronic device provided in other implementations of the present disclosure. The pulling manner of an electronic device such as an electronic device 40 provided in implementations of the present disclosure may be longitudinal pulling. The electronic device 40 may include a first carrier 41, a second carrier 42, and a flexible screen assembly 43. The first carrier 41 and the second carrier 42 can be used to carry the electronic device 40. The first carrier 41 and the second carrier 42 can move relative to each other, such that a part of the flexible screen assembly 43 extends outside or retracts inside the electronic device 40. Longitudinal pulling refers to a manner of pulling in a direction perpendicular to a display direction of the flexible screen assembly 43.

The electronic device provided in implementations of the present disclosure are introduced in detail in the foregoing, and specific examples are applied herein to set forth the principle and implementations of the present disclosure, and the foregoing illustration of implementations is only to help in understanding the present disclosure. Meanwhile, those of ordinarily skill in the art may make variations and modifications to the present disclosure in terms of the specific implementations and application scopes according to the ideas of the present disclosure. Therefore, the specification shall not be construed as limitations to the present disclosure.

What is claimed is:

1. An electronic device, comprising:
a first carrier and a second carrier movable relative to each other;
a driving mechanism disposed on the second carrier, wherein the driving mechanism comprises a first driving member and a second driving member spaced apart from the first driving member, and the second driving member is movably connected with the second carrier through a first bracket;
a flexible screen assembly, having a first end connected with the first carrier, and wrapped around the driving mechanism, wherein the driving mechanism is configured to drive the flexible screen assembly to move when the first carrier and the second carrier move relative to each other; and
an adjustment mechanism configured to adjust the driving mechanism to make the flexible screen assembly in a tensioned state, wherein the adjustment mechanism comprises a first elastic member, the first elastic member has one end abutting against the first bracket and another end abutting against the second carrier, and the first elastic member is in a compressed state to apply an elastic force to the first bracket; and the first elastic member is elastically deformed to drive the second driving member to move in a direction away from the first driving member, when the flexible screen assembly is slack.

2. The electronic device of claim 1, wherein, the flexible screen assembly is wrapped around the first driving member and the second driving member in turn, and the adjustment mechanism is configured to adjust the first driving member and/or the second driving member to increase a distance between the first driving member and the second driving member.

3. The electronic device of claim 1, wherein an elastic deformation amount of the first elastic member is positively related to a slackness degree of the flexible screen assembly.

4. The electronic device of claim 1, wherein the first driving member is fixedly connected with the second carrier.

5. The electronic device of claim 2, wherein the flexible screen assembly has a second end connected with the first carrier, and a projection of the second end on a plane where the first carrier is located falls between a projection of the first driving member on the plane where the first carrier is located and a projection of the second driving member on the plane where the first carrier is located.

6. The electronic device of claim 2, wherein the flexible screen assembly has a second end connected with the second driving member, and the second driving member is rotatable to wind or release the flexible screen assembly.

7. The electronic device of claim 2, wherein the first driving member has a diameter larger than the second driving member.

8. The electronic device of claim 2, further comprising a processor and a detecting mechanism, wherein the processor is electrically coupled with the detecting mechanism and the adjustment mechanism respectively, the detecting mechanism is configured to detect a state of the flexible screen assembly, and the processor is configured to:
control the adjustment mechanism to drive the first driving member to move in a direction away from the second driving member, and/or control the second driving member to move in a direction away from the first driving member, to increase the distance between the first driving member and the second driving member, when the flexible screen assembly is slack.

9. The electronic device of claim 5, wherein the flexible screen assembly comprises a flexible display module and a driving belt, the flexible display module has a first end which serves as the first end of the flexible screen assembly and is connected with an external surface of the first carrier, the flexible display module has a second end connected with a first end of the driving belt, the flexible display module is wrapped around the first driving member, wherein a second end of the driving belt which serves as the second end of the flexible screen assembly is connected to an internal surface of the first carrier, and the driving belt is wrapped around the second driving belt.

10. The electronic device of claim 5, wherein the flexible screen assembly comprises a flexible display module, a support member, and a driving belt, the flexible display module covers the support member, the support member is wrapped around the first driving member, the support member has a first end which serves as the first end of the flexible screen assembly and is connected with the first carrier, the support member has a second end connected with a first end of the driving belt, wherein a second end of the driving belt which serves as the second end of the flexible screen assembly is connected with the first carrier, and the driving belt is wrapped around the second driving member.

11. The electronic device of claim 3, wherein the second carrier is provided with a protrusion, the first bracket defines a through hole, the protrusion passes through the through hole, the through hole has a size larger than the protrusion, and a first movement space is defined between the first bracket and the protrusion in a movement direction of the flexible screen assembly.

12. The electronic device of claim 11, wherein the first movement space is smaller than a maximum deformation amount of the first elastic member to keep the first elastic member in the compressed state.

13. The electronic device of claim 11, wherein the second carrier defines an accommodating groove, the first bracket has a straight portion and a bending portion, the straight portion is sleeved on the protrusion through the through hole, the bending portion is bendably disposed relative to the straight portion, the bending portion is located in the accommodating groove, a second movement space is defined between the bending portion and a groove wall of the accommodating groove, the first elastic member is accommodated in the accommodating groove, and the first elastic member has one end abutting against the bending portion and another end abutting against the groove wall of the accommodating groove.

14. The electronic device of claim 8, further comprising a driving apparatus, wherein the driving apparatus comprises a driving motor, a transmission screw rod, and a connecting member, the connecting member is connected with the transmission screw rod, and the connecting member is connected with the second carrier.

15. An electronic device comprising a first carrier, a second carrier, a flexible screen assembly, and an adjustment mechanism, wherein the first carrier and the second carrier are movable relative to each other to drive the flexible screen assembly to move, and when the flexible screen assembly is slack, the adjustment mechanism is configured to adjust the flexible screen assembly to make the flexible screen assembly in a tensioned state;

wherein the second carrier is provided with a first driving member and a second driving member spaced apart from the first driving member, and the second driving member is movably connected with the second carrier through a first bracket;

wherein the adjustment mechanism comprises a first elastic member, the first elastic member has one end abutting against the first bracket and another end abutting against the second carrier, and the first elastic member is in a compressed state to apply an elastic force to the first bracket; and the first elastic member is elastically deformed to drive the second driving member to move in a direction away from the first driving member, when the flexible screen assembly is slack.

16. The electronic device of claim 15, wherein the adjustment mechanism is configured to adjust a first end of the flexible screen assembly to absorb a slackness amount of the flexible screen assembly, when the flexible screen assembly is slack.

17. The electronic device of claim 16, wherein the flexible screen assembly is wrapped around the first driving member, the flexible screen assembly has the first end connected with the first carrier, and the adjustment mechanism is configured to adjust a bending part of the flexible screen assembly to increase a distance between the bending part of the flexible screen assembly and the first end of the flexible screen assembly.

18. The electronic device of claim 16, wherein the flexible screen assembly is wrapped around the first driving member, the flexible screen assembly has the first end movably connected with the first carrier, and when the flexible screen assembly is slack, the adjustment mechanism is configured to control the first end of the flexible screen assembly to move in a direction away from the first driving member, to absorb a slackness amount of the flexible screen assembly.

19. The electronic device of claim 17, wherein the flexible screen assembly has a second end connected with the second driving member, and the second driving member is rotatable to wind or release the flexible screen assembly.

* * * * *